(12) United States Patent
Susitaival et al.

(10) Patent No.: US 8,750,333 B2
(45) Date of Patent: Jun. 10, 2014

(54) BACKWARDS-COMPATIBLE APPROACH TO FIELDS OF A PROTOCOL LAYER

(75) Inventors: Riikka Susitaival, Helsinki (FI);
Magnus Lindström, Sollentuna (SE);
Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 13/372,893

(22) Filed: Feb. 14, 2012

(65) Prior Publication Data

US 2013/0044698 A1 Feb. 21, 2013

Related U.S. Application Data

(60) Provisional application No. 61/442,492, filed on Feb. 14, 2011.

(51) Int. Cl.
*H04J 3/24* (2006.01)
*H04W 28/06* (2009.01)
*H04L 29/08* (2006.01)

(52) U.S. Cl.
CPC ......... *H04W 28/06* (2013.01); *H04L 29/08027* (2013.01)
USPC ....................................... 370/476

(58) Field of Classification Search
CPC .... H04L 29/08; H04L 29/0827; H04W 28/06
USPC .......... 370/465, 469, 470, 471, 472, 474, 476
See application file for complete search history.

(56) References Cited

U.S. PATENT DOCUMENTS

| | | | |
|---|---|---|---|
| 7,477,600 B1 | 1/2009 | Mor et al. | |
| 2003/0123484 A1* | 7/2003 | Harriman | 370/471 |
| 2005/0270996 A1 | 12/2005 | Yi et al. | |
| 2008/0186936 A1* | 8/2008 | Chun et al. | 370/342 |
| 2011/0002305 A1* | 1/2011 | Park et al. | 370/331 |
| 2011/0085508 A1 | 4/2011 | Wengerter et al. | |
| 2012/0014366 A1* | 1/2012 | Kim et al. | 370/338 |

FOREIGN PATENT DOCUMENTS

| | | |
|---|---|---|
| EP | 1 372 310 A1 | 12/2003 |
| WO | 03/077457 A1 | 9/2003 |
| WO | 2009/017340 A2 | 2/2009 |
| WO | 2010/120103 A2 | 10/2010 |
| WO | 2012/110958 A1 | 8/2012 |

OTHER PUBLICATIONS

3GPP TS 36.213 V10.0.1; 3rd Generation Partnership Project; Technical Specification Group Radio Access Network; Evolved Universal Terrestrial Radio Access (E-UTRA); Physical layer procedures (Release 10), Dec. 2010 (98 pages).

(Continued)

*Primary Examiner* — Pao Sinkantarakorn
(74) *Attorney, Agent, or Firm* — Nixon & Vanderhye P.C.

(57) ABSTRACT

Fields such as sequence numbers and length indicators of protocol layers are extended in extended headers so as to be backwards compatible with corresponding legacy headers. The existing fields of the legacy headers are not directly extended. Instead, existing fields are logically concatenated with other fields of the extended header. Whether the extended fields or legacy fields will be used can be determined dynamically based on current transport block size or semi-statically by higher layers.

44 Claims, 12 Drawing Sheets

(56) References Cited

OTHER PUBLICATIONS

3GPP TS 36.306 V10.0.0; 3rd Generation Partnership Project; Technical Specification Group Radio Access Network; Evolved Universal Terrestrial Radio Access (E-UTRA); User Equipment (UE) radio access capabilities (Release 10), Dec. 2010 (17 pages).

3GPP TS 36.321 V10.0.0; 3rd Generation Partnership Project; Technical Specification Group Radio Access Network; Evolved Universal Terrestrial Radio Access (E-UTRA); Medium Access Control (MAC) protocol specification (Release 10), Dec. 2010 (53 pages).

3GPP TS 36.322 V10.0.0; 3rd Generation Partnership Project; Technical Specification Group Radio Access Network; Evolved Universal Terrestrial Radio Access (E-UTRA); Radio Link Control (RLC) protocol specification (Release 10), Dec. 2010 (39 pages).

3GPP TS 36.323 V10.0.0; 3rd Generation Partnership Project; Technical Specification Group Radio Access Network; Evolved Universal Terrestrial Radio Access (E-UTRA); Packet Data Convergence Protocol (PDCP) specification (Release 10), Dec. 2010 (24 pages).

3GPP TS 36.331 V10.0.0; 3rd Generation Partnership Project; Technical Specification Group Radio Access Network; Evolved Universal Terrestrial Radio Access (E-UTRA); Radio Resource Control (RRC); Protocol specification (Release 10), Dec. 2010 (276 pages).

R2-075189; TSG-RAN WG2 meeting #60, Nov. 5-9, 2007, Korea, "Draft1 minutes of the 59bis TSG-RAN WG2 meeting, Shanghai, China, Oct. 8-12, 2007" (116 pages).

International Search Report and Written Opinion mailed Apr. 25, 2012 in corresponding International Application No. PCT/IB2012/050676 (14 pages).

International Preliminary Report on Patentability dated Aug. 21, 2013 in International Application No. PCT/IB2012/050676 (9 pages).

* cited by examiner

BACKWARDS-COMPATIBLE APPROACH TO FIELDS OF A PROTOCOL LAYER

RELATED APPLICATION

This application claims priority and benefit of U.S. provisional application 61/442,492 entitled "BACKWARDS-COMPATIBLE APPROACH TO EXTEND LENGTH AND SEQUENCE NUMBER FIELDS" filed on Feb. 14, 2011, which is incorporated herein by reference in its entirety.

TECHNICAL FIELD

Technical field of present disclosure generally relates to extending length and/or sequence number fields in a header structure of a communication layer, and in particular to extending length and/or sequence number fields in the header structure to allow for efficient data transmission.

BACKGROUND

Examples of 3GPP (3$^{rd}$ Generation Partnership Project) LTE (Long Term Evolution) protocol stacks for control and user planes are illustrated in FIG. 1. One or more of these layers are implemented in nodes in LTE. For example, in a typical UE (user equipment), all layers of both control and user plane protocol stacks are implemented. In a typical eNB (or more generically a network node), all user plane protocol layers and all control plane protocol layers except for the NAS layer are implemented.

According to 3GPP, the new LTE Rel-10 UE categories have recently been defined so that data rates up to 3 and 1.5 Gbps can be reached in the downlink and uplink, respectively. This is enabled by increasing the number of layers for spatial multiplexing and the number of carriers that can be configured for the single UE. With these enhancements, the maximum Transport Block (TB) size is increased to 299852 bits (37482 octets) at the physical (PHY) layer, and the number of transport blocks that can be sent in a single subframe is increased to 10.

However, the U-plane protocol formats defined for LTE Rel-8/9 do not fully support transmission at the high data rates offered by the improved physical layer. This applies to all three sublayers of the L2 (link) layer, i.e., the MAC (Media Access Control) layer, the RLC (Radio Link Control) layer and the PDCP (Packet Data Convergence Protocol) layer.

A size of a MAC SDU (Service Data Unit) contained in a MAC PDU (Protocol Data Unit) can be signalled in a length field (L) of a MAC subheader except when a MAC SDU is included last in the MAC PDU (i.e., not followed by any other data, control or padding) for which no L field is included. Examples of existing MAC subheader structures are illustrated in FIGS. 2A, 2B and 2C The MAC subheader includes of two reserved bits (R), a 1-bit extension field (E), a 5-bit logical channel field (LCID). The E field is used to indicate whether more fields are present in the MAC subheader. When the E field is not set, then the MAC subheader includes fields R/R/E/LCID as illustrated in FIG. 2C. The last subheader in the MAC PDU and subheaders for fixed size MAC control elements conform to this structure.

For other MAC SDUs, i.e., when the E field is set, the corresponding MAC subheader also includes a 1-bit format field (F) and a 7- and 15-bit L field as illustrated in FIGS. 2A and 2B, respectively. That is, when the E field is set, the MAC subheader includes R/R/E/LCID/F/L fields. The F field indicates the size of the L field. When the F field is set, the L field size is 15 bits as illustrated FIG. 2B, and when the F field is not set, the L field size is 7 bits as illustrated in FIG. 2A.

As illustrated in FIG. 3, a MAC PDU includes a MAC header, zero or more MAC control elements, zero or more MAC SDUs, and an optional padding. The MAC PDU header includes one or more MAC subheaders in which each MAC subheader corresponds to one of a MAC SDU, control element, or padding. The entire MAC PDU—header, control elements, SDUs and padding—is transported in a transport block of the physical (L1) layer.

Referring back to FIGS. 2A-2C, note that the L field is at most 15 bits long. Thus, the maximum supported size of a MAC SDU including the L field is 32767 octets. The L field is included in all MAC PDUs having more than one MAC subheaders. For example, if a MAC PDU includes more than 2 octets of padding in addition to data, the size of the MAC SDU for the data needs to be indicated with the L field. According to the Rel-8/9 specification, each L1 code-word contains exactly one MAC PDU (transport block). Taking the L field limitations into account, the MAC layer cannot fill the MAC PDU with one MAC SDU for the data. On the other hand, having multiple MAC SDUs for new data per logical channel and per transport block is not allowed. With these limitations, a consequence is that the MAC layer cannot make use of the large transport formats offered by the physical layer.

In certain systems supporting RLC, each of the RLC SDUs in an RLC PDU is associated with an 11-bit length indicator field "LI". This limits the possibility of concatenation when RLC SDUs or a remainder of a segmented RLC SDU exceeds 2047 octets. The last RLC SDU does not have the LI field, and it is therefore only limited by the maximum size of the RLC PDU. If concatenation of RLC SDUs is not possible, the RLC layer may generate multiple RLC PDUs instead. Unfortunately, this consumes more RLC SNs (sequence numbers).

This can be problematic since the RLC SN is a 10-bit field (1024 values) which limits the usable window size to 511 RLC PDUs. That is, the RLC transmitter can generate and transmit up to 511 RLC PDUs before receiving an accumulative status message. As will be discussed later, this becomes particularly limiting when concatenation of RLC SDUs is not possible. Further, the RLC PDU size is limited by the RLC SO (segmentation offset) fields—SOstart and SOend—which are 15 bits each. Thus the size of an RLC PDU is limited to the size of the maximum size of a MAC SDU with the L field.

PDCP supports PDCP SDUs of up to 8188 octets in size, which results in a maximum PDCP Data PDU size of 8190 octets including the header. Note that the PDCP SDU size can only be upper-bounded, but it is hardly possible to enforce a lower limit. Typical PDCP SDU (e.g., IP packet) sizes are in the order of 1500 octets. It should further be noted that PDCP PDUs exceeding 2047 octets require special handling at the RLC layer as indicated above.

SUMMARY

A non-limiting aspect of the disclosed subject matter is directed to a method performed at a network node of a wireless network. Base station is an example of the network node. The method comprises determining whether or not to use an extended header for a protocol layer in wirelessly communicating with a mobile terminal. The protocol layer can be a layer above a physical (L1) layer. The method also comprises using the extended header for the protocol layer in transmitting and receiving a protocol data unit (PDU) of the protocol layer when it is determined that the extended header is to be used. The extended header comprises a legacy indicator (L-I)

field of a predetermined number of indicator bits for use in indicating a value of a characteristic of the PDU. There can be a legacy indicator threshold value associated with the characteristic, in which the legacy indicator threshold value is a maximum value of the characteristic that can be indicated by the legacy indicator field L-I. The extended header comprises an extended indicator field (E-I) that can be logically concatenated with the legacy indicator field L-I such that the E-I/L-I concatenation comprises sufficient number of bits to specify a value of the characteristic of the PDU beyond the legacy indicator threshold value.

Another non-limiting aspect of the disclosed subject matter is directed to a method performed at a mobile terminal of a wireless network. User equipment is an example of the network node. The method comprises determining whether or not to use an extended header for a protocol layer in wirelessly communicating with a network node. The protocol layer can be a layer above a physical (L1) layer. The method also comprises using the extended header for the protocol layer in transmitting and receiving a protocol data unit (PDU) of the protocol layer when it is determined that the extended header is to be used. The extended header comprises a legacy indicator (L-I) field of a predetermined number of indicator bits for use in indicating a value of a characteristic of the PDU. There can be a legacy indicator threshold value associated with the characteristic, in which the legacy indicator threshold value is a maximum value of the characteristic that can be indicated by the legacy indicator field L-I. The extended header comprises an extended indicator field (E-I) that can be logically concatenated with the legacy indicator field L-I such that the E-I/L-I concatenation comprises sufficient number of bits to specify a value of the characteristic of the PDU beyond the legacy indicator threshold value.

Another non-limiting aspect of the disclosed subject matter is directed to a network node such as a base station of a wireless network. The network node comprises a plurality of protocol layer units structured to communicate with a mobile terminal. The plurality of protocol layer units comprise a RRC unit structured to perform functions associated with a RRC layer, a PDCP unit structured to perform functions associated with a PDCP layer, a RLC unit structured to perform functions associated with a RLC layer, and MAC unit structured to perform functions associated with a MAC layer. At least one protocol layer unit is structured to determine whether or not to use an extended header for a protocol layer in wirelessly communicating with the mobile terminal, and to use an extended header for the protocol layer in transmitting and receiving a protocol data unit (PDU) of the protocol layer. The protocol layer can be a layer above a physical (L1) layer. The extended header comprises a legacy indicator (L-I) field of a predetermined number of indicator bits for use in indicating a value of a characteristic of the PDU. There can be a legacy indicator threshold value associated with the characteristic, in which the legacy indicator threshold value is a maximum value of the characteristic that can be indicated by the legacy indicator field L-I. The extended header comprises an extended indicator field (E-I) that can be logically concatenated with the legacy indicator field L-I such that the E-I/L-I concatenation comprises sufficient number of bits to specify a value of the characteristic of the PDU beyond the legacy indicator threshold value.

Another non-limiting aspect of the disclosed subject matter is directed to a mobile terminal such as a user equipment of a wireless network. The mobile terminal comprises a plurality of protocol layer units structured to communicate with a network node. The plurality of protocol layer units comprise a RRC unit structured to perform functions associated with a RRC layer, a PDCP unit structured to perform functions associated with a PDCP layer, a RLC unit structured to perform functions associated with a RLC layer, and MAC unit structured to perform functions associated with a MAC layer. At least one protocol layer unit is structured to determine whether or not to use an extended header for a protocol layer in wirelessly communicating with the network node, and to use an extended header for the protocol layer in transmitting and receiving a protocol data unit (PDU) of the protocol layer. The protocol layer can be a layer above a physical (L1) layer. The extended header comprises a legacy indicator (L-I) field of a predetermined number of indicator bits for use in indicating a value of a characteristic of the PDU. There can be a legacy indicator threshold value associated with the characteristic, in which the legacy indicator threshold value is a maximum value of the characteristic that can be indicated by the legacy indicator field L-I. The extended header comprises an extended indicator field (E-I) that can be logically concatenated with the legacy indicator field L-I such that the E-I/L-I concatenation comprises sufficient number of bits to specify a value of the characteristic of the PDU beyond the legacy indicator threshold value.

Another non-limiting aspect of the disclosed subject matter is directed to a non-transitory computer readable medium storing therein programming instructions executable by a computing unit of a network node of a wireless network. The programming instructions cause the network node to perform the method performed at or on behalf of the network node as described above.

Another non-limiting aspect of the disclosed subject matter is directed to a non-transitory computer readable medium storing therein programming instructions executable by a computing unit of a mobile terminal of a wireless network. The programming instructions cause the mobile terminal to perform the method performed at or on behalf of the mobile terminal as described above. In one or more of the above summarized aspects, the determination of whether to use the extended headers can be made dynamically or semi-statically.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
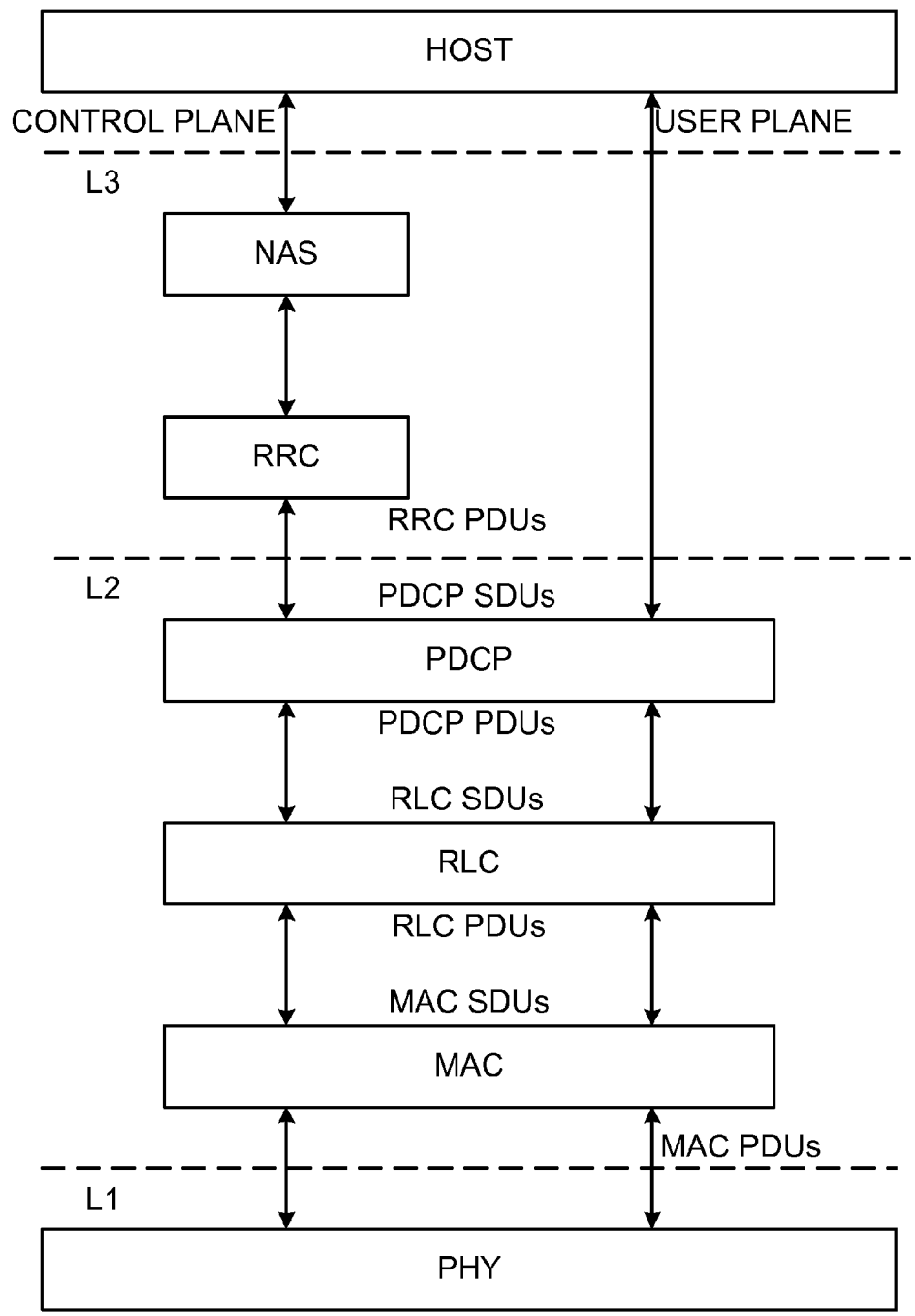
FIG. 1 illustrates an example LTE protocol stack for control and user planes.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this disclosure, 3GPP is primarily used as examples for explanation purposes. However, the scope of this disclosure is not limited to the set of 3GPP wireless network systems and can encompass many domains of wireless network systems. Also, a base station (e.g. RBS, NodeB, eNB, eNB) will be used as an example of a node that includes one or more link layer units in which the described method can be performed to prioritize measurements. However, it should be noted that the disclosed subject matter is applicable to the link layer units of any node in the network such as a mobile terminal (e.g. UE).

In this disclosure, terms "legacy" and "enhanced" will be used. The context in which these terms are used to make the meanings clear. Thus, FIGS. 2A, 2B and 2C can be described as showing examples of legacy MAC subheader structures.

As previously indicated, the existing subheader structures of the link layers, e.g., MAC, RLC, PDCP, may not fit well to the large transport formats offered by the lower layers. This can cause issues at the MAC layer. For example, if the size of the transport block provided by the physical layer is more than 32767 octets, i.e., if the physical layer provides an enhanced TB, the legacy MAC layer cannot fill the enhanced TB with a single MAC SDU for one logical channel, which can resulting in excessive padding.

Issues can arise at the RLC layer due to the legacy MAC layer's inability to make use of the enhanced TB. For example, having multiple MAC SDUs per MAC PDU can lead to multiple RLC PDUs as well. But it is generally understood that the intention of the MAC/RLC protocols has been to have only one new RLC PDU per logical channel per TB.

Having many RLC PDUs generated per TB and subframe can also lead to a shortage of RLC sequence numbers. For example, assume that two new RLC PDUs per component carrier and per TB are generated, thus resulting in 20 RLC PDUs per subframe (5 serving cells with two or more codewords (MIMO) on each). As a consequence, the RLC sequence number space is occupied in 511/20≈25 milliseconds. This means that the RLC transmitter can send new data for only 3 HARQ RTTs (Hybrid Automatic Repeat reQuest Round-Trip Time) before running out of RLC sequence numbers. If an RLC status report, acknowledging the oldest outstanding RLC PDUs, has not yet been received by then, the RLC protocol stalls. That means that the RLC layer cannot provide new data to lower layers, which in turn causes underutilization of the assigned radio resources, and the maximum data rates defined for enhanced TB, e.g., Rel-10 of LTE, will not be reached.

At the PDCP layer level, 2048 PDCP PDUs can be brought in flight with the current PDCP Sequence Number space. With an IP packet size of 1500 bytes, this corresponds to ~3 MByte. With an assumed PDCP RTT of 25 ms, this limits the theoretical throughput to roughly 980 Mbps (3 MByte×8 bits/byte/0.025 s). This is significantly lower than the peak rate provided by the physical layer in LTE Rel-10. Note that it is not possible or at least not recommended to bring more than 2048 PDCP PDUs in flight to avoid ambiguity during a handover. If the PDCP packets cannot be uniquely identified during the handover, data loss and HFN (Hyper Frame Number) de-synchronization may occur resulting in significant performance degradation.

In a non-limiting aspect of the present disclosure, the above-described and other issues associated with legacy systems are addressed. Backwards compatible method(s), unit(s) and/or system(s) are provided to extend one or more fields of a protocol header. Examples of such fields include length and sequence numbers. For each legacy field to be extended, the extension is not necessarily accomplished by directly extending the field in a bit-wise contiguous fashion. That is, the existing legacy field slated for extension is not itself necessarily extended. Rather, the legacy field is logically concatenated with other fields in the header structure.

In another non-limiting aspect, method(s), unit(s) and/or system(s) are provided to allow for efficient data transmission (low overhead) for scenarios where TBs are small (e.g., low rate services or poor coverage), and to control whether normal (non-extended) or extended fields are used by the transmitter.

In some aspects, the use of the header field extensions is dynamically selected, for example, based on the current transport block size of the physical (L1) layer. In some other aspects, the use is semi-statistically configured by the higher layers such as RRC. The described aspects ensure that the receiver at any point in time knows the format of the fields used by the transmitter, i.e., the receiver would know whether the fields have been extended or not.

Figure 4:
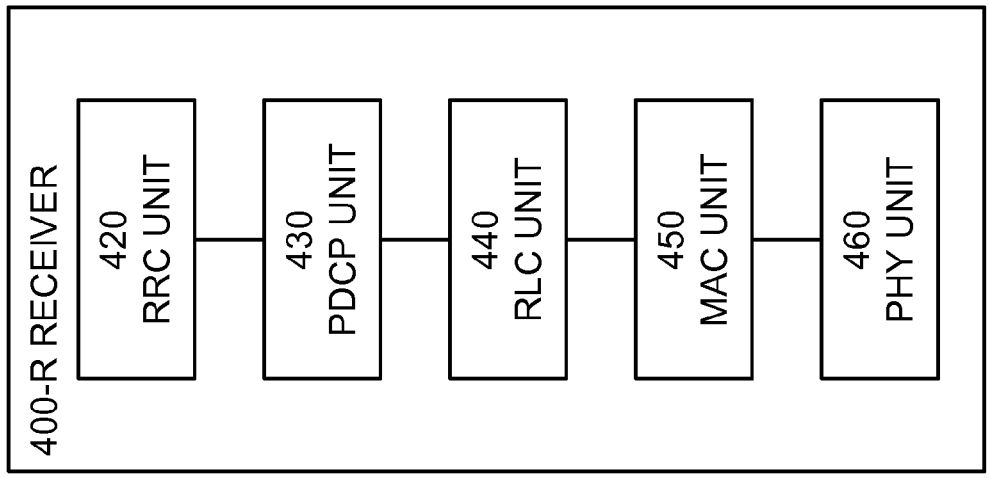
FIG. 4 illustrates an embodiment of transmitter and receiver nodes of a wireless network.
Figure 4:
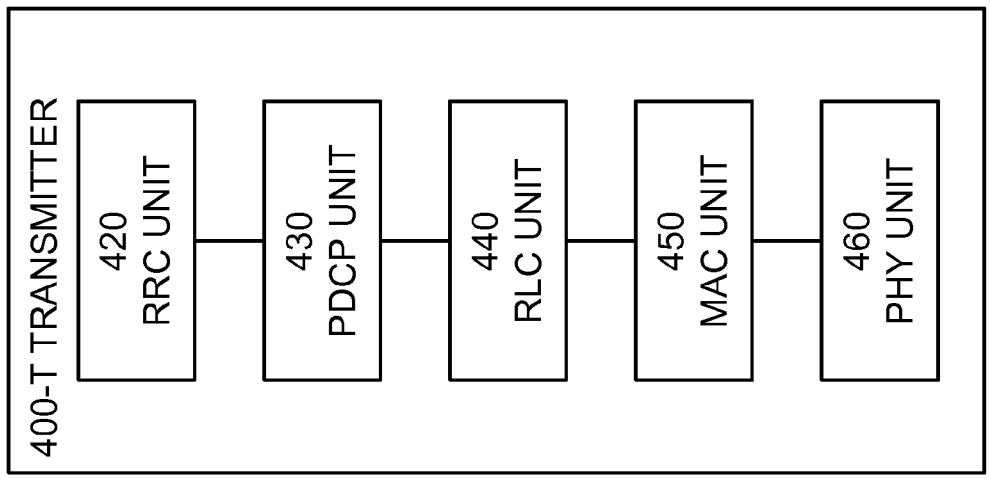

FIG. 4 illustrates an embodiment of transmitter 400-T and a receiver 400-R of a wireless network. Each of the transmitter 400-T and the receiver 400-R includes a RRC (radio resource control) unit 420, a PDCP unit 430, a RLC unit 440, a MAC unit 450 and a PHY unit 460, each of which are structured to perform the functions of the RRC, PDCP, RLC, MAC and PHY protocol layers respectively. Further details of these units will be provided in conjunction with the descriptions of one or more methods of providing backwards-compatible approaches to fields of protocol layers.

Note that FIG. 4 is a logical representation of the transmitter 400-T and the receiver 400-R. Thus, each of the RRC unit 420, the PDCP unit 430, the RLC unit 440, the MAC unit 450 and the PHY unit 460 need not be physically separate from each of the other units. It is fully contemplated that any combination of the units may be integrated into a single physical device. Further, each of the units may be implemented in multiple physical components operatively structured and coupled to each other to perform the respective function of the unit. Yet further, to the extent that some of the units share common features, multiple units may share common components.

While not explicitly shown, it is also contemplated that one or both of the transmitter 400-T and the receiver 400-R each as a whole can be implemented as a combination of hardware and software components. For example, the transmitter 400-T and/or the receiver 400-R may include one or more processors, which as described above can themselves be combinations of hardware and software structured to perform the functions associated with the units.

Figure 5:
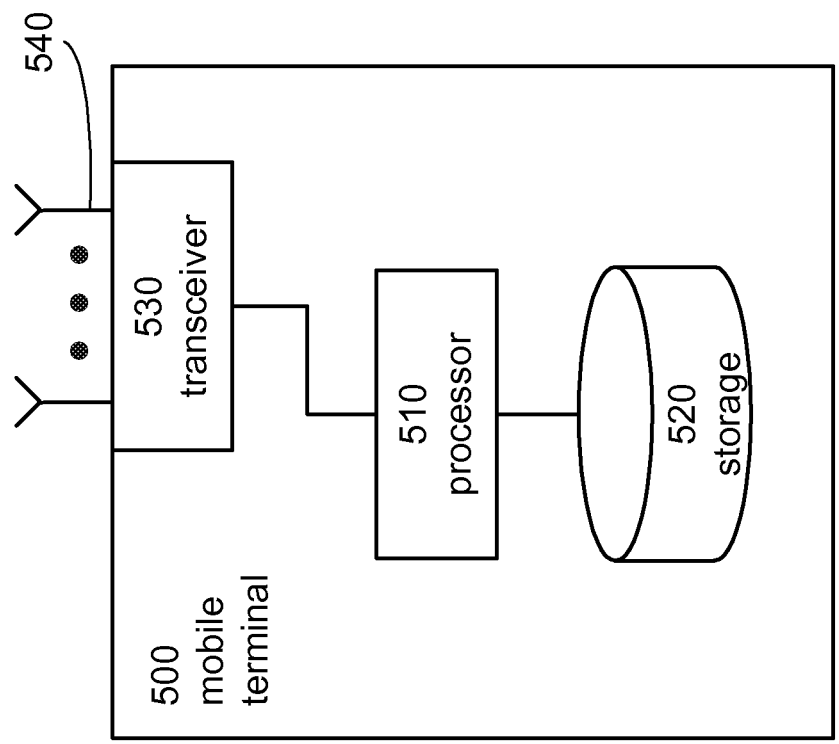
FIG. 5 illustrates an embodiment of a mobile terminal.

It should also be noted that a node of the wireless network can function as a transmitter 400-T and also as a receiver 400-R. For example, FIG. 5 illustrates an embodiment of a mobile terminal 500 (e.g., a UE) that includes a processor 510 structured to control an overall process of the mobile terminal 500, a storage 520 structured to store and recall data and instructions, and a transceiver 530 to process signals received by one or more antennas 540 and to process signals to be transmitted from the one or more antennas 540. The mobile terminal 500 functions as the transmitter 400-T on the uplink and as a receiver 400-R on the downlink.

While not shown, the mobile terminal 500 may include one or more of RRC unit 420, the PDCP unit 430, the RLC unit 440, the MAC unit 450 and the PHY unit 460 illustrated in FIG. 4. One or more units of FIG. 4 may also be implemented through a combination of hardware and software. For example, the processor 510 may execute programming instructions stored in a non-transitory computer readable medium, such as the storage 520, to perform the functions of the units. The programming instructions may also be received in a transitory manner and stored in the non-transitory computer readable medium accessible to the mobile terminal 500. For example, updates may be stored and received.

Figure 6:
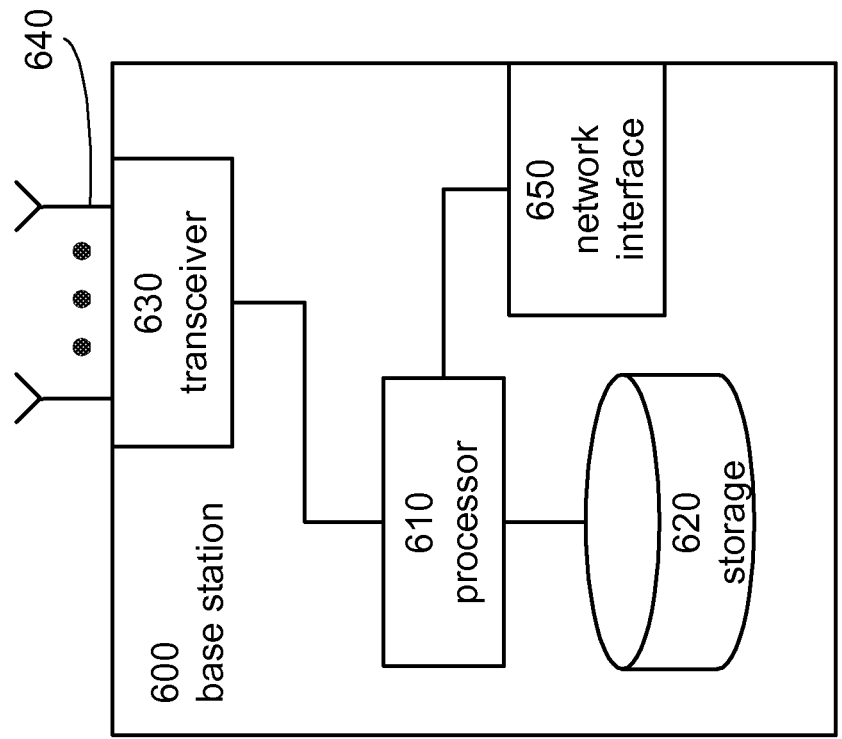
FIG. 6 illustrates an embodiment of a network node of a wireless network.

As another example, FIG. 6 illustrates an embodiment of a network node 600 such as a base station (e.g., eNB) of the wireless network. The network node 600 includes a processor 610 structured to control an overall process of the network node 500, a storage 620 structured to store and recall data and instructions, a transceiver 630 to process signals received by one or more antennas 640 and to process signals to be transmitted from the one or more antennas 640, and a network interface 650 structured to interface with core network nodes. During downlink, the network node 600 functions as the transmitter 400-T, and during uplink, network node 600 functions as the receiver 400-R.

While not shown, the network node 600 may include one or more of RRC unit 420, the PDCP unit 430, the RLC unit 440, the MAC unit 450 and the PHY unit 460 illustrated in FIG. 4. One or more units of FIG. 4 may also be implemented through a combination of hardware and software. For example, the processor 610 may execute programming instructions stored in a non-transitory computer readable medium, such as the storage 620, to perform the functions of the units. The programming instructions may also be received in a transitory manner and stored in the non-transitory computer readable medium accessible to network node 600. For example, updates may be stored and received.

Referring back to FIG. 4, the units of the transmitter 400-T and/or the receiver 400-R can perform a method provide backwards compatibility to protocol layers. When one or more bits for a header field, e.g., length fields or sequence number fields, are needed, a conventional approach is to add the bits to the existing field. But unless there are unused (reserved) bits on either side of the header field or unless the concerned header field is the last header field in the header, adjacent header fields need to be shifted towards unused bit or added bits. The drawback of this approach is that header fields that were octet aligned (see LCID field in FIGS. 2A, 2B, 2C) require that the content is bit-shifted during header encoding and decoding. Furthermore, this approach is not necessarily backwards compatible if the receiver does not support the new format.

To address this and other drawbacks of the conventional extension approach, a new approach is proposed in one aspect of the present disclosure. In this new approach, a legacy field that is to be extended is logically combined with an extension part that can be located in another part of the header. The extension part can be prepended as most significant bit(s) or appended as least significant bit(s) depending on the implementation to the legacy field to form an extended field. This maintains the positions of all other fields and minimizes the need for bit-shifting during header encoding and decoding. This approach is also backwards compatible as will be explained below.

Figure 2A:
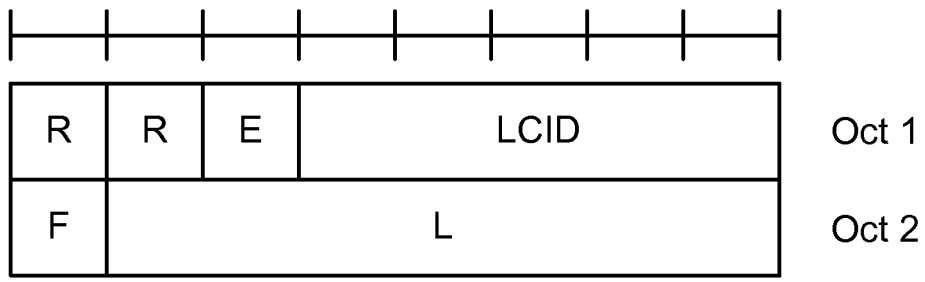
FIGS. 2A, 2B and 2C respectively illustrate legacy MAC subheaders with a length field L of 7-bits, 15-bits and for fixed sized MAC control elements.
Figure 2B:
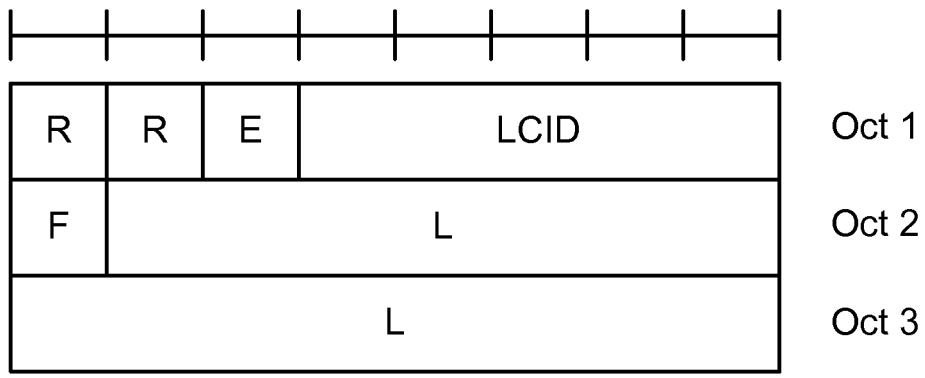
Figure 2C:
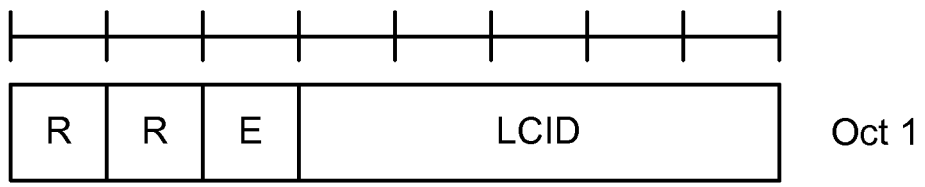
Figure 3:
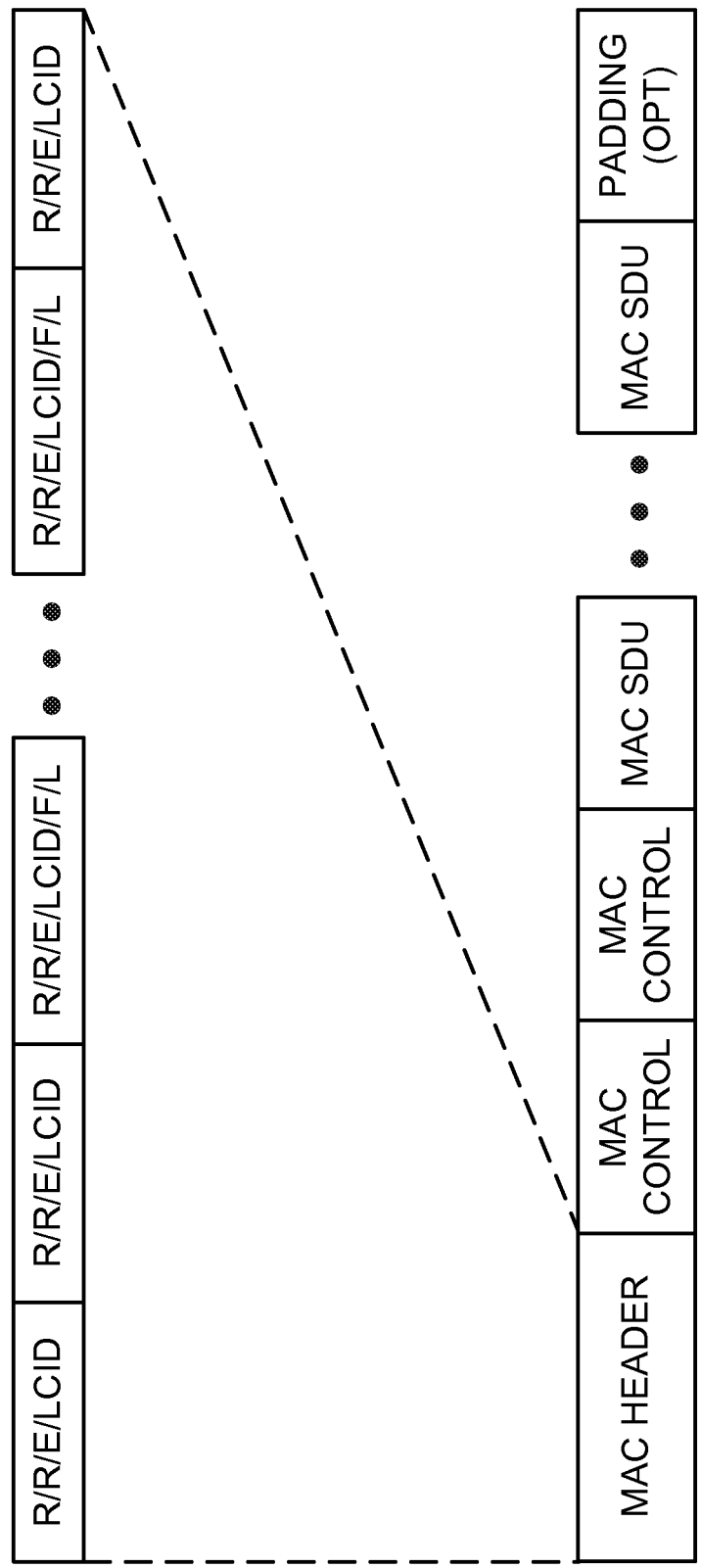
FIG. 3 illustrates an example of a legacy MAC PDU.

For example, in the MAC subheader according to LTE Rel-8/9 illustrated in FIGS. 2A, 2B and 2C, there are two reserved (R) bits. But in an aspect of the present disclosure, one or both of them can be used for extending a header field such as the length (L) field. If the L field is extended directly using the conventional approach, all fields before the L field would need to be shifted. Instead, a preferable approach is to logically prepend or append one or both R bits to the bits of the legacy L field to form an extended length (EL) field while keeping the positions of all existing fields.

Figure 7A:
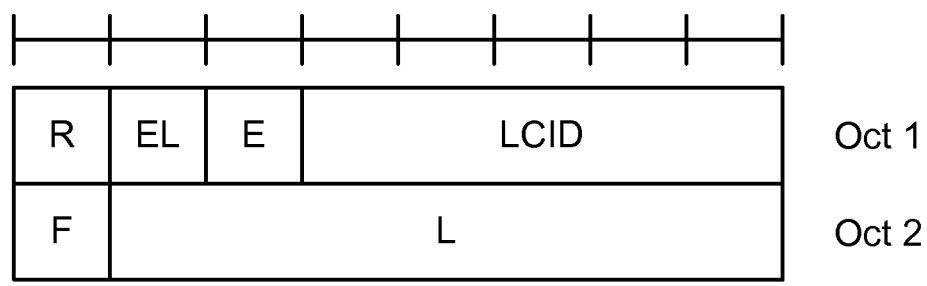
FIGS. 7A and 7B illustrate examples of extended MAC subheaders.
Figure 7B:
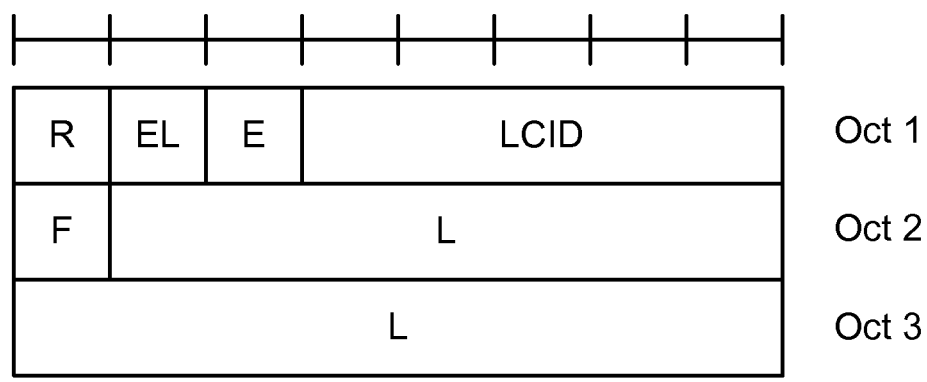
Figure 8:
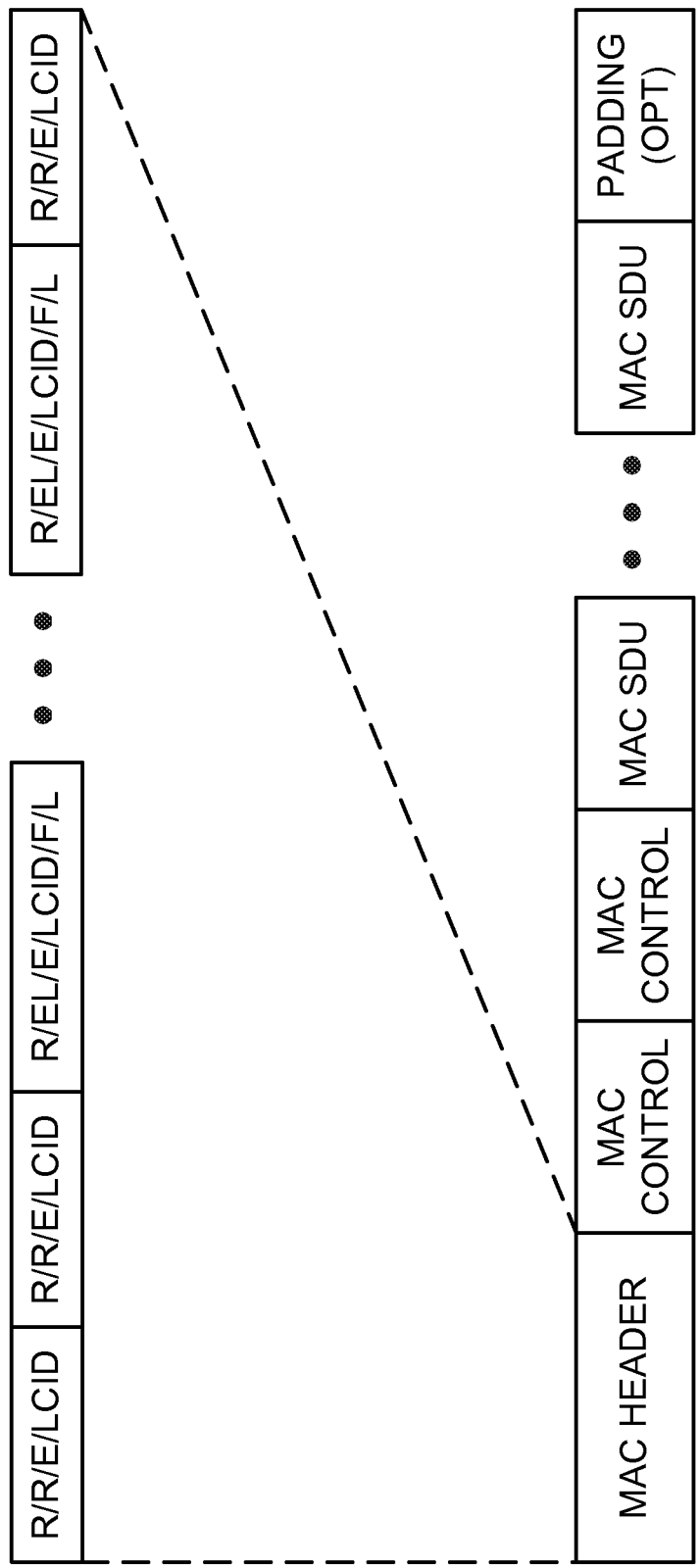
FIG. 8 illustrates an example MAC PDU with an extended MAC header.

FIGS. 7A and 7B illustrate examples of extended MAC subheaders in which the L field is extended by one bit. Both subheaders have the R/EL/E/LCID/F/L structures. In these figures, one of the two reserved bits (R-bits) is used as an extended length (EL) field bit. When extended headers are used, the legacy L field of 7 or 15 bits can be extended with the EL bit. Thus, an 8-bit (when the format F field is not set, see FIG. 7A) or a 16-bit length indicator is obtained (when the format F field is set, see FIG. 7B). FIG. 8 illustrates a MAC PDU with an example of an extended MAC header which includes extended MAC subheader structures illustrated in FIGS. 7A and 7B.

It is of course recognized that any size indicated by the extended 8-bit length L field in FIG. 7A can also be indicated by the legacy 15-bit length L field in the legacy MAC subheader structure illustrated in FIG. 2B. However, the advantage of the inventive subheader structure illustrated in FIG. 7A over the legacy structure illustrated in FIG. 2B is that the structure in FIG. 7A takes one less octet.

If the EL field is used as the most significant bit for the L field, the header formats of Rel-8/9 UEs and Rel-10 UEs are exactly same when the MAC SDU length is not any greater than the size that can be indicated with legacy header format of having 15 bits. This is because the R-bit in Rel-8/9 UEs is set always to 0.

Figure 9A:
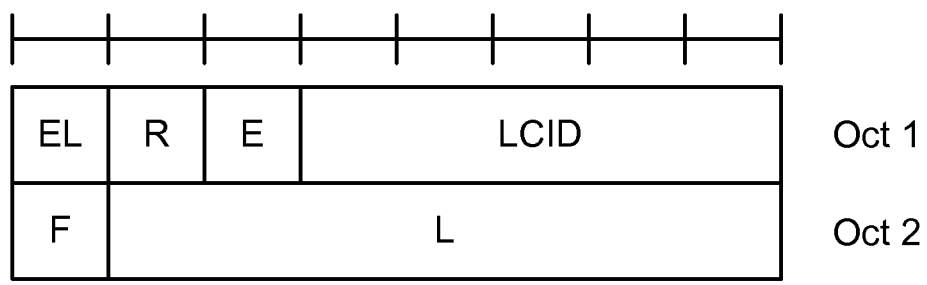
FIGS. 9A and 9B illustrate alternate examples of extended MAC subheaders.
Figure 9B:
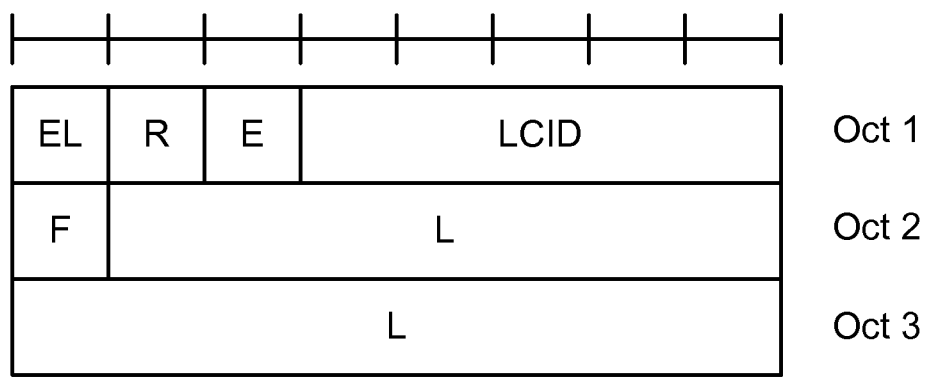

FIGS. 9A and 9B illustrate alternative examples of extended MAC subheaders with structures EL/R/E/LCID/F/L in which the L field is extended by one bit. In these figures, the EL bit is placed in the left-most bit of the first octet. This makes it convenient since no bit-shifting is required when combining the EL bit with the L field.

While not illustrated, an embodiment of an extended MAC subheader may include extended MAC subheaders of FIGS. 9A and 9B. Also while not illustrated, the format (F) field may be extended using the R bits. The F field may be extended instead of or in addition to the L field.

Changing the header formats and extending the current length and sequence number fields for all Rel-10 UEs is not necessarily desired. Since extension of length or sequence number fields in L2 typically implies increased overhead, it is desirable to support both the legacy format for legacy data rates and an extended format for the new very high rates. Support of the legacy format is also needed for UEs in legacy Rel-8/9 networks.

Figure 10:
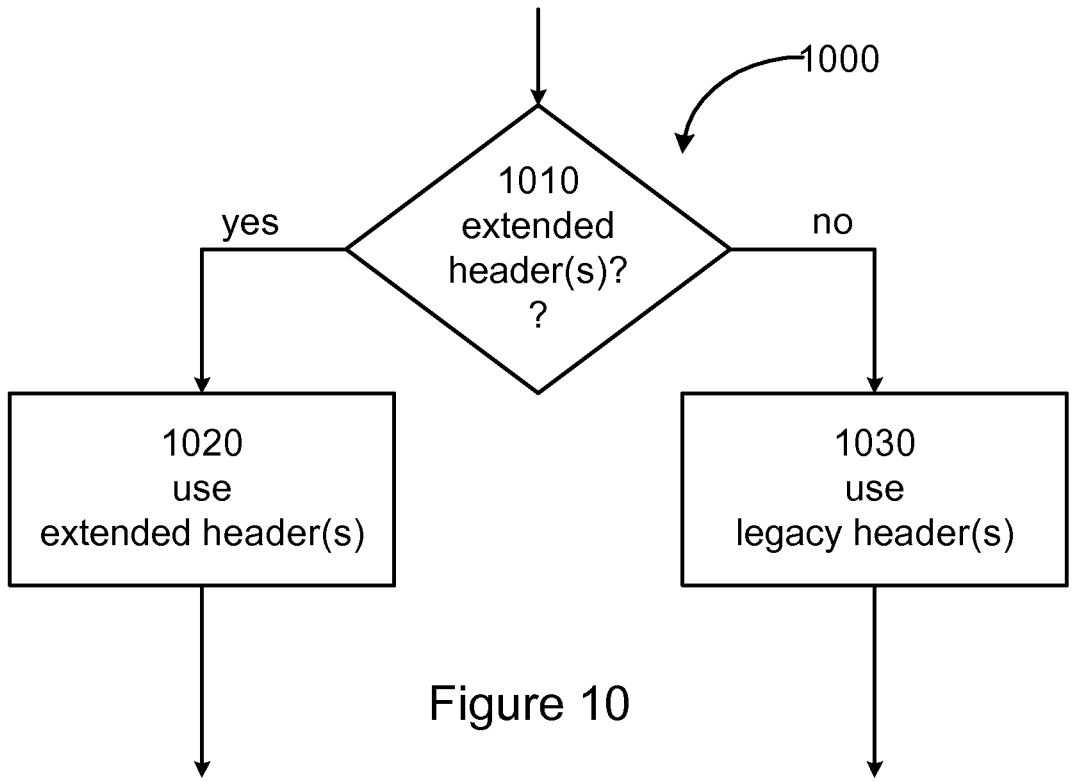
FIG. 10 illustrates an example method to operate a network node of a wireless network.

FIG. 10 illustrates an example method 1000 to operate a network node 600 such as a base station of a wireless network to provide backwards compatibility in protocol layers. In step 1010, the network node 600 determines whether or not to use an extended header for a protocol layer in wirelessly communicating with a mobile terminal 500. Any protocol layer above the L1 layer may make such a decision. To be more precise, any of the RRC unit 420, the PDCP unit 430, the RLC unit 440 and the MAC unit 450 of the network node 600 may decide whether or not to use the extended header. For example, the MAC unit 450 may decide to use the extended MAC header as illustrated in FIG. 8.

For ease of reference, a phrase "protocol layer unit" will be used to generically refer to any unit corresponding to protocol layers above the L1 layer. Thus in step 1010, it can be said that a protocol layer unit determines whether or not the extended header is to be used. As mentioned, any of the protocol layer units 420, 430, 440, 450 as well as the PHY unit 460 illustrated in FIG. 4 may be a combination of the processor 610 executing instructions stored in the storage 620 of the network node 600. When it is determined that the extended header will be used, the protocol layer unit in step 1020 uses the extended header for the protocol layer to be used in transmitting and receiving protocol data units of the protocol layer to and from the mobile terminal 500. When it is not determined that the extended header will be used, the protocol layer unit in step 1030 uses a legacy header.

As an example illustration of using an extended header, the MAC unit 450 may determine that an extended MAC header will be used to extend the length L field one of the MAC SDUs in step 1010. Then in step 1020, the MAC unit 450 can use the extended length EL field corresponding to the SDU in the extended MAC header. As another example illustration, the RLC unit 440 may determine that the sequence number SN field should be extended by using the extended RLC header in step 1010. Then in step 1020, the RLC unit 440 can use an E-SN (extended sequence number) field in the extended RLC header.

Note that when the extended field is "used", it does not necessarily imply that the extended field is set to a fixed value. The value of the extended field bit or bits will depend on the particular circumstances. When the extended field is used, it is to indicate that the field is not ignored when the extended header is written and is also not ignored when the extended header is read.

In one aspect, the extended subheader includes a legacy indicator (L-I) field of a predetermined number of indicator bits for use in indicating a value of a characteristic of the PDU. There is also a legacy indicator threshold value associated with the characteristic. The legacy indicator threshold value can be described as a maximum value of the characteristic that can be indicated by the legacy indicator field L-I.

The extended header also comprises an extended indicator field (E-I) that can be logically concatenated with the legacy indicator field L-I. The logical E-I/L-I concatenation includes sufficient number of bits to specify a value of the characteristic beyond the legacy indicator threshold value. Since the E-I/L-I combination is logically concatenated, the E-I field bits and the L-I field bits need not be bit-wise contiguous with each other. They can also occupy different octets of the extended header.

To serve as an illustration, the L field of a MAC SDU subheader is used. As illustrated in FIGS. 2A and 2B and described above, the L field—which is an example of a legacy indicator L-I field—indicates the size of one of the MAC SDUs included in the MAC PDU. Since the legacy L field is either 7 or 15 bits long, there is a certain maximum size of the SDU beyond which the size cannot be indicated with the legacy L field. The legacy threshold value in this instance with the legacy L field can be a legacy transport block size, i.e., the maximum TB size that can be indicated by the legacy L field.

But as illustrated in FIGS. 7A, 7B, 9A and 9B and also as described above, the EL field—which is an example of the E-I field—can be logically concatenated with the L field. The EL-L combination can indicate a size of the MAC SDU beyond the threshold that was possible with the legacy L field alone. Note that the EL and L fields are bitwise non-contiguous. They also occupy different octets.

The following should also be noted. In FIGS. 7A, 7B, 9A and 9B, the bit position of the EL field in the extended MAC header corresponds to one of the bit position of the reserved R bits of the legacy MAC header. Thus, from the perspective of a legacy equipment such as a Rel 8/9 UE, the extended MAC header structure conforms to the legacy MAC header structure. This enables backwards compatibility, which is a substantial benefit.

Generally, it can be said that the extended indicator field E-I comprises one or more bits, and the bit positions of the E-I field of the extended header correspond to bit positions of reserved bits of the legacy header of the protocol layer. Thus, when a legacy equipment sees the extended header from the perspective of the legacy equipment, the structure of the extended header conforms to the structure of the legacy header.

In one aspect of the proposed method, the format selection is performed dynamically where the extended headers are used only when they are needed. For example, in the MAC layer, the dynamic selection of the L field size may be performed based on the transport block size or the MAC SDU size. This is possible since the L field only depends on the current TB size and the transmitting and receiving entities—e.g., the network node 600 and the mobile terminal 500—know the TB sizes.

Figure 11:
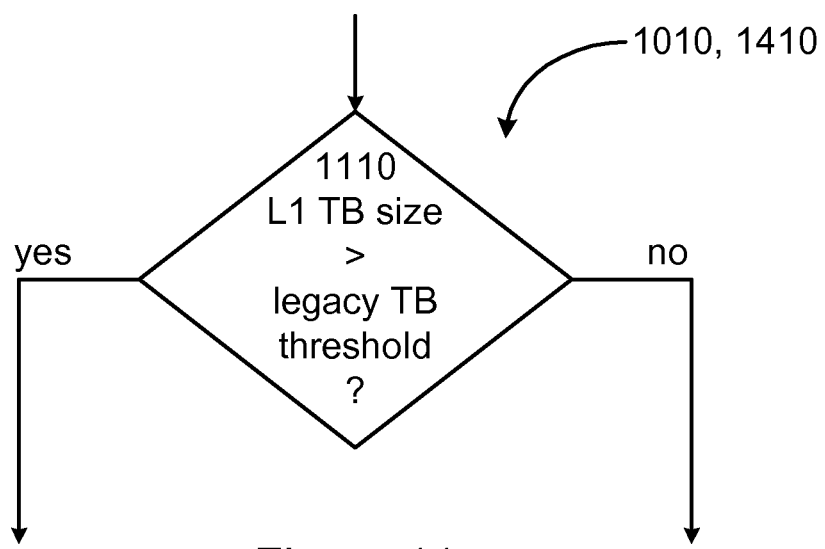
FIG. 11 illustrates an example process to determine whether or not to use an extended header of a protocol layer at the network node.

FIG. 11 illustrates an example process to implement step 1010 to determine whether or not to use the extended header so that the format can be selected dynamically—that is selected when needed. In step 1110 as seen, at the protocol layer, e.g., at the MAC layer, it is determined whether a transport block size at the L1 (physical) layer is greater than a legacy transport block threshold size. Recall that the protocol layer is hierarchically above the L1 layer. The MAC unit 450 may make this determination. While the MAC unit 450 is most likely, any of the RRC unit 420, the PDCP unit 430 and the RLC unit 440 may also make this determination. For convenience, it is assumed that the protocol layer for the steps illustrated in FIG. 11 is the MAC layer.

Referring back to FIG. 10, the method 1000 proceeds to use the extended header in step 1020 when it is determined that the extended header will be used (YES branch in FIG. 11). Thus, when the extended header is the extended MAC header, the step 1020 of using the extended MAC header can be described as using an extended length field EL of the extended MAC header such that a logical concatenation EL/L includes sufficient number of bits to specify a TB size greater than the legacy TB threshold size. The EL field will be used. Whether or not the each bit of the EL field will be set to zero or one will depend on the size of the MAC SDU, but the field is not ignored. The logical concatenation can be such that the bit(s) of the EL field are concatenated to be the most significant bit(s) of the EL/L logical concatenation. Of course, the EL bit(s) can also be concatenated to be the least significant bit(s).

Note that when the TB size indicated by the physical layer exceeds the size that can be indicated by legacy L field, the length field can be extended by one or two reserved bits. The actual extension can be performed using either a currently unused, i.e., reserved, bit or bits of a legacy header. As mentioned above, when the extension is performed using the reserved bits, the extended header conforms to the structure of the legacy header from the perspective of the legacy equipment.

Extension can also be performed by using bit or bits in an additional octet following the legacy header format. In this case, the size of the header depends on the size of the transport block (MAC PDU) indicated by the lower layer. Note that when the additional octets are located at the end, the extended header still conforms to the structure of the legacy header up until the point where the additional octets start.

One benefit (of which there can be several) of the dynamically extended header fields is that for lower category UEs not supporting highest bitrates such as Rel-8/9 UEs, biggest TB sizes are not provided. So there are no interoperability problems because in practice, the lower category UEs do not need to implement the extended headers. Furthermore, dynamically extended header fields minimize the header overhead for UEs that do support the very high data rates but are operating in radio conditions or load conditions preventing usage of large transport blocks.

The use of extended headers can also be semi-statistically configured by means of a higher layer signaling. RRC signaling is one non-limiting example of the higher layer signaling. There can be one or more higher layer configuration to indicate that many fields are extended, including, for example, MAC L field, RLC SO, SOstart and SOend fields, RLC LI and RLC SN fields and finally PDCP SN field.

In one embodiment, the network node 600 configures the mobile terminal 500 to use the extended header for a protocol layer or layers. That is, for the mobile terminal 500, the use of the extended formats can be configured with the higher layers. This can be true for both uplink and downlink. For example, the network node 600 (e.g., eNB) can configure the use of the extended headers in the mobile terminal 500 (e.g., UE) by sending a configuration message in the form of RRC commands to the mobile terminal 500. The RRC layer in the mobile terminal 500 can configure the use of extended headers. An RRC message is one form of configuration messages. Others include MAC control elements, specific RNTI on PDCCH, specific grant formats, and so on.

Figure 12:
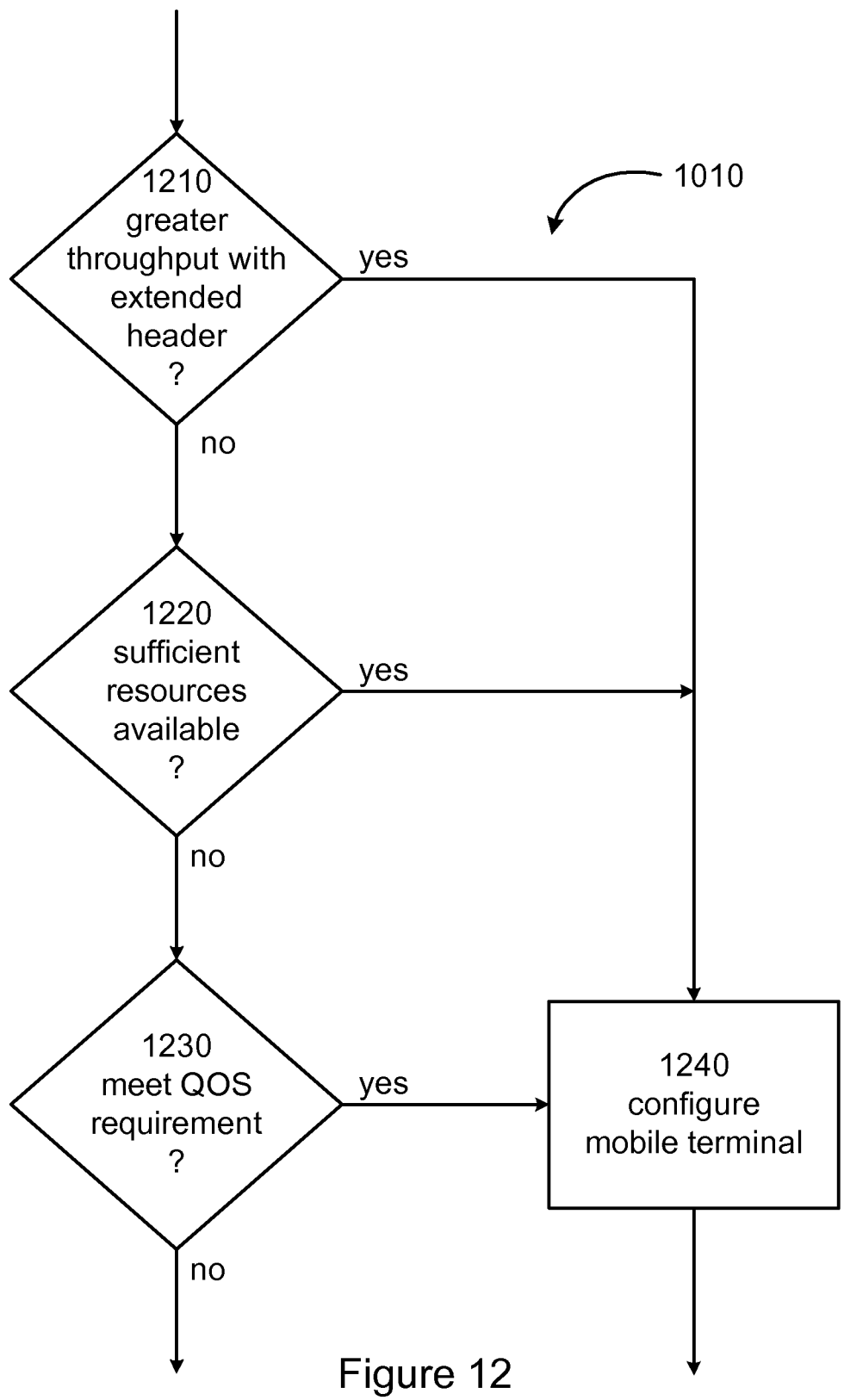
FIG. 12 illustrates another example process to determine whether or not to an extended header of a protocol layer at the network node.

The network node 600 can semi-statically determine whether or not extended headers will be used and configure the extended headers accordingly. FIG. 12 illustrates an example process performed at the network node 600 to implement step 1010 to determine whether or not to use the extended headers semi-statically.

As seen, in step 1210, it is determined whether a transmission using the extended header will result in a sufficiently greater throughput than a transmission without using the extended header. For example, it may be determined whether a transmission with the field extension at a protocol layer will result in sufficiently greater throughput than a transmission without the field extension. For convenience, this is referred to as a first condition. For simple voice communications, there may be little to no difference in the throughput so the first condition may not be satisfied. For high bandwidth applications such as video streaming, the first condition may be satisfied, i.e., field extensions if used could very well result in a significantly better throughput.

In step 1220, it is determined whether sufficient transmission resources are available for the transmission using the extended header, e.g., transmission with the field extension. This is referred to as the second condition. The transmission resources can include a number of available carriers, number of available resource blocks per UE in a carrier, whether or not MIMO (multiple input multiple output) configuration can be used, and so on. If the network node 600 is currently serving many mobile terminals 500, it may not have sufficient bandwidth available to provide a requested video streaming service, for example.

In step 1230, a third condition of whether the transmission using the extended header, e.g., transmission with the field extension, will meet a minimum quality of service (QoS) requirement associated with the transmission. As an illustration, video streaming requires a relatively higher throughput meaning that less robust MCS (modulation and coding scheme) could be used. But with less robust MCS, chances of errors, e.g., BER (bit error rate), also increase. When there is significant interference (such as when a UE is at an edge of a cell), the BER may be too high for video streaming—that is, the minimum QoS requirement may not be met for video streaming for the UE at the cell edge. When the third condition is not satisfied, i.e., when the minimum QoS requirement is unlikely to be met, it is determined that the use of the extended header for that protocol layer will not be used.

In FIG. 12, when any one or more of the first, second and third conditions are met, it is determined that the extended header is to be used for the protocol layer. The network node 600 having determined semi-statically that the extended headers for one or more protocol layers will be used configures the mobile terminal 500 in step 1240. The configuration can be performed through sending a configuration message in the form of a RRC message, MAC control elements, RNTI on PDCCH, and so on.

It should be noted that the first, second and third conditions are merely some examples of conditions that may be checked to determine whether or not to use the extended header. Regardless of what conditions are checked, when the decision is made to use the extended headers, the network node 600 may configure the mobile terminal 500 in a configuration message.

A non-exhaustive list of fields that can be indicated to be extended include the MAC L field; RLC SO (segmentation offset), SOstart and SOend fields, RLC LI (length indicator) and RLC SN (sequence number) fields; and PDCP SN and FMS (first missing PDCP SN) fields. Thus, in extended headers corresponding to the data units (control/user SDU/PDU) of the protocol layers, any one or more of the following fields may be used by the corresponding protocol layer units 420, 430, 440, 450 in one implementation of step 1020 to configure the extended headers of the protocol layers:

In an extended PDCP header of a PDCP data unit:
  an extended sequence number field (PDCP ESN) to be logically concatenated with a legacy sequence number field (PDCP SN);
  an extended first missing PDCP SN field (EFMS) to be logically concatenated with a legacy first missing PDCP SN field (FMS);

In an extended RLC header of a RLC data unit:
  an extended segment offset field (RLC ESO) to be logically concatenated with a legacy segment offset field (RLC SO);
  an extended segment offset start field (RLC ESOstart) to be logically concatenated with a legacy segment offset start field (RLC SOstart);
  an extended segment offset end field (RLC ESOend) to be logically concatenated with a legacy segment offset end field (RLC SOend);
  an extended length indicator field (RLC ELI) to be logically concatenated with a legacy length indicator field (RLCLI);
  an extended sequence number field (RLC ESN) to be logically concatenated with a legacy sequence number field (RLC SN);

In an extended MAC header of a MAC data unit:
  an extended length field (MAC EL) to be logically concatenated with a legacy length field (MAC L); and
  an extended format field (MAC EF) to be logically concatenated with a legacy format field (MAC F).

The configuration can be per data radio bearers (DRBs), per specific RLC mode (Acknowledged/Unacknowledged), or per DL (downlink) or UL (uplink) direction. It can be that in some scenarios, the TBs are larger in DL (or UL) than in UL (or DL) and extended header field can be required in one direction, but not in the other. For example, in LTE Rel-10, larger TBs are supported in the DL than in the UL.

In a handover situation, the target cell may need to know the header format currently used for the communication between the terminal and the network. Thus, the use of semi-statistically configured extended header formats is preferably communicated between the source and the target network nodes, e.g., eNBs.

Figure 13:
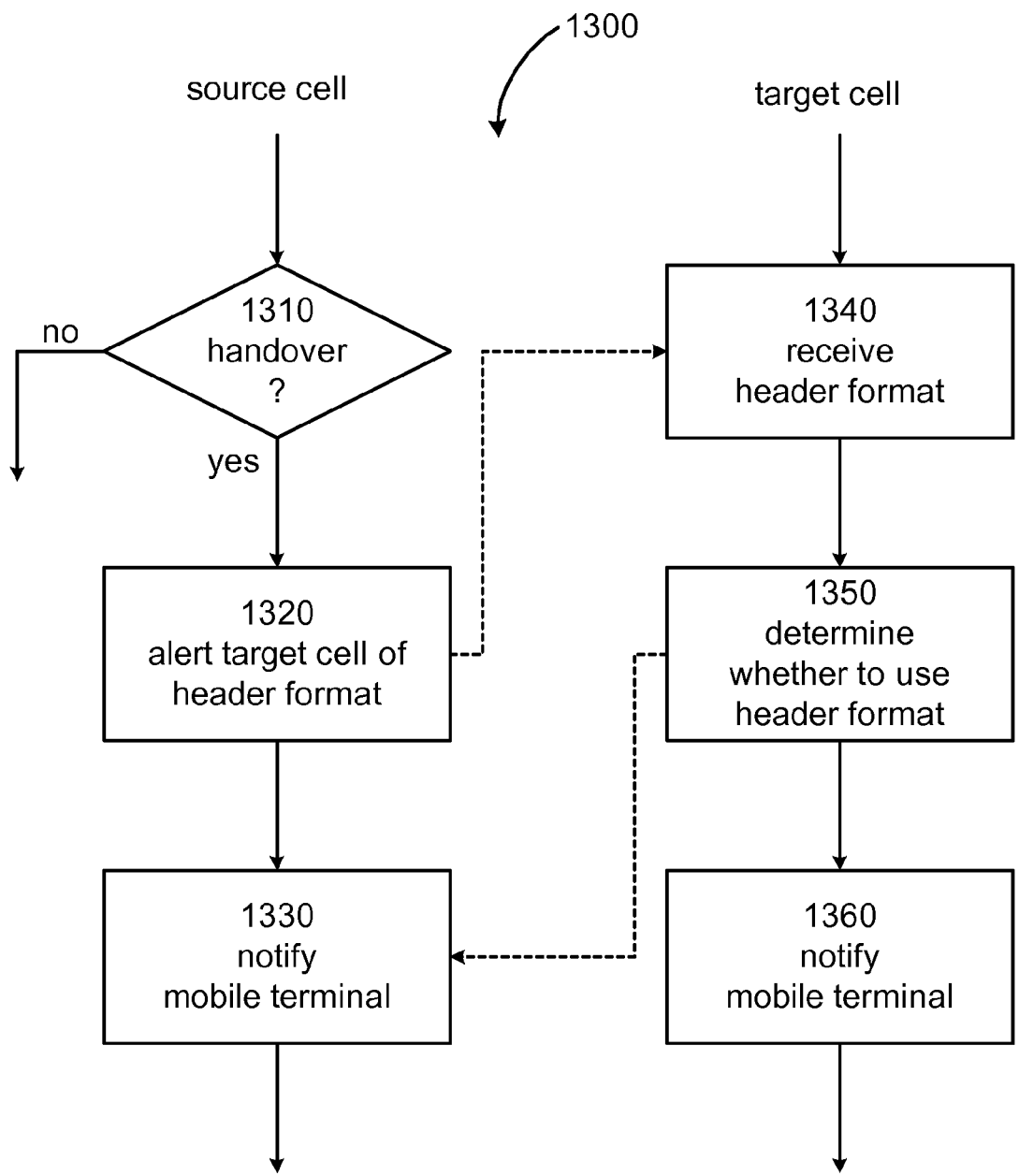
FIG. 13 illustrates an example process to provide header format information in a handover of a mobile terminal between source and target cells.

FIG. 13 illustrates an example process to provide the header format information in a handover. Steps 1310, 1320 and 1330 are performed at a source cell and steps 1340, 1350 and 1360 are performed at a target cell. Both cells can be network nodes. To state it another way, a network node 600 may be a source cell in one instance and a target cell in another. In step 1310, the source cell determines whether a handover of a mobile terminal 500, e.g., a UE, to a target cell will take place. If so, then in step 1320, the source cell alerts the target cell of the header format being used between the source cell and the mobile terminal, and the target cell in step 1340 receives the alert. This communication can be performed over an X2 interface between.

Preferably, the mobile terminal 500 is informed whether extended header fields are to be used after the handover to the target cell. Thus in step 1350, the target cell determines whether or not the extended header format will be used. The target cell can inform the source cell of the decision—yes or no—and the source cell can in turn notify the mobile terminal in step 1330. Alternatively, the target cell can directly notify the mobile terminal 500 of the decision in step 1360.

Figure 14:
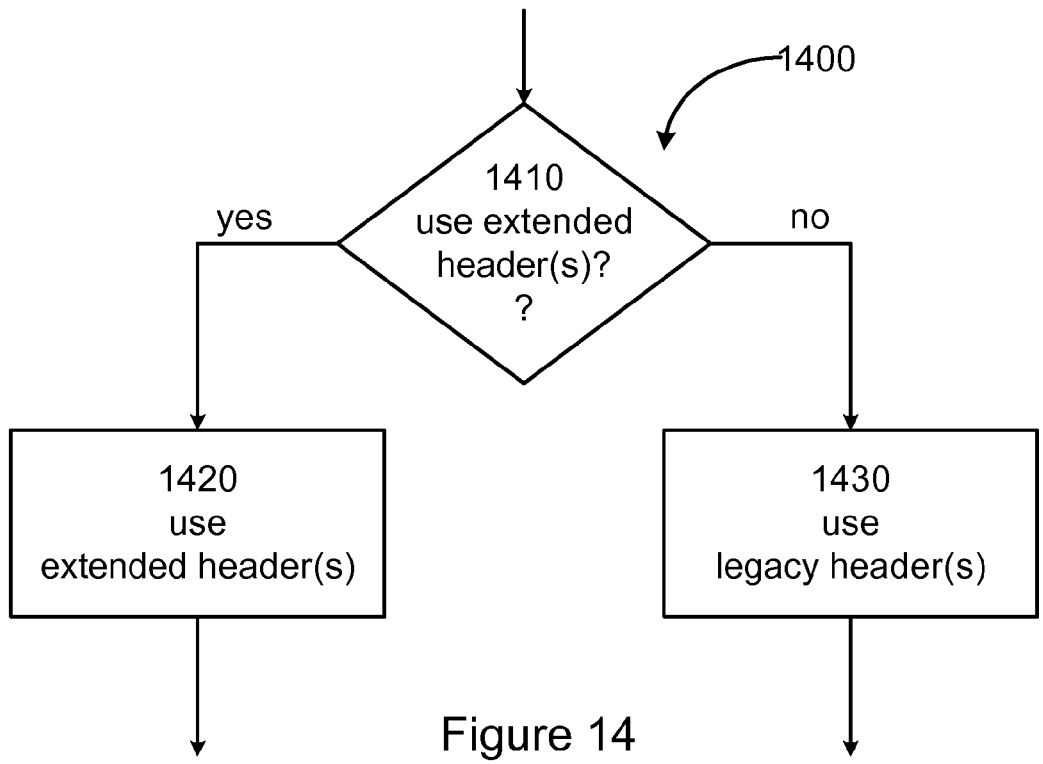
FIG. 14 illustrates an example method to operate a mobile terminal of a wireless network.

FIG. 14 illustrates an example method 1400 to operate a mobile terminal 500 such as a user equipment to provide backwards compatibility in protocol layers. The illustrated steps are similar to the steps of method 1000 to operate the network node. This should come as little surprise since the mobile terminal 500 and the network node 600 should be using the same header configurations when communicating with each other.

In step 1410, the mobile terminal 500 determines whether or not to use an extended header for a protocol layer in wirelessly communicating with the network node 600. As with the network node 600, any protocol layer above the L1 layer may make such a decision. As mentioned, any of the protocol layer units 420, 430, 440, 450 as well as the PHY unit 460 illustrated in FIG. 4 may be a combination of the processor 610 executing instructions stored in the storage 620 of the network node 600.

When it is determined that the extended header will be used, the mobile terminal's protocol layer unit in step 1420 uses the extended header for the protocol layer to be used in transmitting and receiving protocol data units of the protocol layer to and from network node 600. An example is the MAC unit 450 determining that an extended MAC header will be used to extend the length L field one of the MAC SDUs as described above. Again, the term "used" is to indicate that the field is not ignored. The composition of the extended sub-headers for the mobile terminal 500 is same or similar to the composition of the extenders of the network node 600. Thus, detailed description will be omitted herein.

As indicated above, the extended header use can be determined dynamically—i.e., used when needed. In the MAC layer, the dynamic selection of the L field size may be performed based on the transport block size or the MAC SDU size since both the network node 600 and the mobile terminal 500 know the TB sizes. Thus, FIG. 11 also represents an example process to implement step 1410 to determine whether or not to use the extended header so that the format can be selected dynamically Also as indicated above, the extended header can be used semi-statically, e.g., through higher layer signaling. In one of the embodiments described above, the network node 600 determines the use of the extended headers in the mobile terminal 500 and configures the mobile terminal 500 of the extended header use in a configuration message, e.g., see step 1240 in FIG. 12. The configuration message can be in the form of a RRC messages, MAC control element, specific RNTI on PDCCH, specific grant format, and so on.

Figure 15:
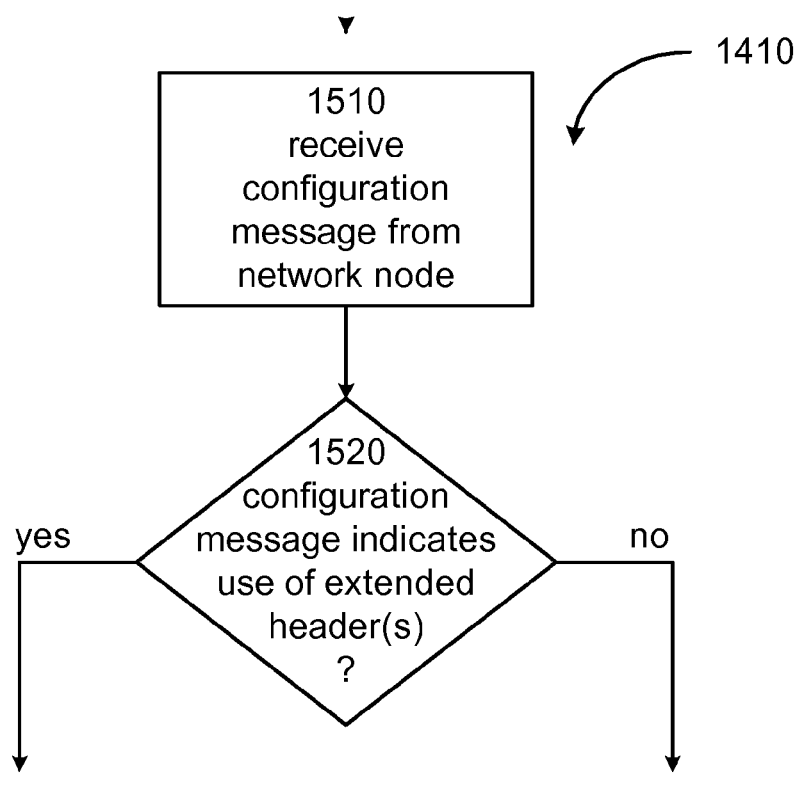
FIG. 15 illustrates an example process to determine whether or not to an extended header of a protocol layer at the mobile terminal.

FIG. 15 illustrates an example process to implement step 1410 to determine whether or not to use the extended header of a protocol layer. The mobile terminal 500 receives a configuration message (e.g., a RRC message) from the network node 600 in step 1510. In step 1520, the protocol layer unit 420, 430, 440, 450 determines whether or not the configuration message indicates that the extended header for one or more protocol layers will be used.

When the configuration message includes extended header configuration, i.e., the use of extended header or headers is indicated, then the step 1420 of configuring the extended header can be performed by the protocol layer units in accordance with the received configuration message. That is, in extended headers corresponding to the data units (control/user SDU/PDU) of the protocol layers, any one or more of the following fields may be used by the corresponding protocol layer units 420, 430, 440, 450 in implementing the step 1420 based on the received configuration message. The fields that can be extended for each of the protocol layers is same or similar to the network node 600, and thus will not be repeated.

Generally, the network and terminal should have very good understanding when exactly the extended header formats are taken into use. In one or more embodiments, the two communication entities (e.g. UE and eNB) apply a re-configuration of the header formats synchronously. This can be achieved by a synchronized procedure (e.g., Random Access based handover in LTE). Alternatively, the reconfiguration can be coupled to an activation time. The activation time can be exact time reference or relative to the time when the configuration command is received.

There are many advantages to the disclosed subject matter. Some (not necessarily exhaustive) advantages include the following. In some of the proposed aspects, fields in the headers of protocol layers are extended, which can be beneficial when transport block sizes exceeding the legacy length fields are provided by the physical layer.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a network node of a wireless network, the method comprising:
   determining whether or not to use an extended header for a protocol layer in wirelessly communicating with a mobile terminal, the protocol layer being a layer above a physical (L1) layer;
   using the extended header for the protocol layer in transmitting and/or receiving a protocol data unit (PDU) of the protocol layer when it is determined that the extended header is to be used; and
   using a legacy header for the protocol layer in transmitting and/or receiving a protocol data unit (PDU) of the protocol layer when it is not determined that the extended header is to be used,
   wherein the extended header comprises a legacy indicator (L-I) field of a predetermined number of indicator bits for use in indicating a value of a characteristic of the PDU,
   wherein there is a legacy indicator threshold value associated with the characteristic, the legacy indicator threshold value being a maximum value of the characteristic that can be indicated by the legacy indicator field L-I,
   wherein the extended header comprises an extended indicator field (E-I) logically concatenated with the legacy indicator field L-I such that the E-I/L-I concatenation comprises sufficient number of bits to specify a value of the characteristic of the PDU beyond the legacy indicator threshold value,
   wherein a size of the extended header for the protocol layer is no greater than a size of the legacy header for the same protocol layer, and
   wherein the step of determining whether or not to use the extended header for the protocol layer comprises determining that the extended header for the protocol layer is to be used when a transport block (TB) size of the L1 layer is greater than a legacy TB threshold size.

2. The method of claim 1,
   wherein the protocol layer is a medium access control (MAC) layer and the extended header is an extended MAC header,
   wherein the legacy indicator field L-I is a legacy length field L of the extended MAC header for indicating a size of a corresponding MAC service data unit (SDU), the legacy TB threshold size being a maximum TB size that can be indicated by the legacy length field L, and
   wherein the step of using PDU of the protocol layer comprises using an extended length field EL of the extended MAC header such that a logical concatenation EL/L of the extended length field EL and the legacy length field L comprises sufficient number of bits to specify a TB size greater than the legacy TB threshold size.

3. The method of claim 1, wherein the step of determining whether or not to use the extended header for the protocol layer comprises sending a configuration message to the mobile terminal to use the extended header for the protocol layer.

4. The method of claim 3, wherein the step of determining whether or not to use the extended header for the protocol layer further comprises any one or more of:
   determining a first condition of whether a transmission using the extended header will result in a greater throughput than a transmission without using the extended header;
   determining a second condition of whether sufficient transmission resources are available for the transmission using the extended header; and
   determining a third condition of whether the transmission using the extended header will meet a minimum quality of service (QoS) requirement associated with the transmission,
   wherein the step of sending the configuration message to the mobile terminal to use the extended header for the protocol layer is performed when any one or more of the first, second and third conditions are met.

5. The method of claim 3, wherein the configuration is based on a combination of any one or more of:
   per data radio bearers (DRBs),
   per specific RLC mode (Acknowledged/Unacknowledged), and
   per DL (downlink) or UL (uplink) direction.

6. The method of claim 3, wherein the configuration message is separate from the extended header used in transmitting the PDU and separate from the extended header used in receiving the PDU.

7. The method of claim 6, wherein the configuration message specifies that the extended header is to be used on the uplink direction from the mobile terminal to the network node.

8. The method of claim 1, wherein the step of using the PDU of the protocol layer comprises any one or more of:

using an extended sequence number field (PDCP ESN) to be logically concatenated with a legacy sequence number field (PDCP SN) in an extended PDCP header of a PDCP data unit;

using an extended first missing PDCP SN field (EFMS) to be logically concatenated with a legacy first missing PDCP SN field (FMS) in the extended PDCP header of the PDCP data unit;

using an extended segment offset field (RLC ESO) to be logically concatenated with a legacy segment offset field (RLC SO) in an extended RLC header of a RLC data unit:

using an extended segment offset field (RLC ESO) to be logically concatenated with a legacy segment offset field (RLC SO) in the extended RLC header of the RLC data unit;

using an extended segment offset start field (RLC ESOstart) to be logically concatenated with a legacy segment offset start field (RLC SOstart) in the extended RLC header of the RLC data unit;

using an extended segment offset end field (RLC ESOend) to be logically concatenated with a legacy segment offset end field (RLC SOend) in the extended RLC header of the RLC data unit;

using an extended length indicator field (RLC ELI) to be logically concatenated with a legacy length indicator field (RLC LI) in the extended RLC header of the RLC data unit;

using an extended sequence number field (RLC ESN) to be logically concatenated with a legacy sequence number field (RLC SN) in the extended RLC header of the RLC data unit;

using an extended length field (MAC EL) to be logically concatenated with a legacy length field (MAC L) in an extended MAC header of a MAC data unit; and using an extended format field (MAC EF) to be logically concatenated with a legacy format field (MAC F) in the extended MAC header of the MAC data unit.

9. The method of claim 1,
wherein the extended indicator field E-I of the extended header comprises one or more bits, and
wherein bit position(s) of the extended indicator field E-I correspond to bit position(s) of reserved bit(s) of the legacy header for the protocol layer such that from a perspective of a legacy equipment, a structure of the extended header conforms to a structure of the legacy header.

10. The method of claim 1,
wherein the extended indicator field E-I of the extended header comprises one or more bits, and
wherein bit position(s) of the extended indicator field E-I are not contiguous with any of the bit position(s) of the legacy indicator field LI of the extended header.

11. The method of claim 1,
wherein the network node is a network node of a source cell of a handover, and
wherein the method further comprises alerting a network node of a target cell of the handover of the extended header being used by the source cell to communicate with the mobile terminal.

12. The method of claim 1,
wherein the network node is a network node of a target cell of a handover, and
wherein the method further comprises:
receiving an indication from a network node of a source cell of the handover of the extended header being used by the source cell to communicate with the mobile terminal;
determining whether the extended header will be used after the handover; and
notifying the mobile terminal of the decision on whether or not the extended header will be used after the handover.

13. A non-transitory computer readable medium storing therein programming instructions executable by a computing unit of a network node of a wireless network such that the computing unit performs the method of claim 1.

14. A method performed at a mobile terminal of a wireless network, the method comprising:
determining whether or not to use an extended header for a protocol layer in wirelessly communicating with a network node, the protocol layer being a layer above a physical (L1) layer;
using an extended header for the protocol layer in transmitting and/or receiving a protocol data unit (PDU) of the protocol layer when it is determined that the extended header is to be used; and
using a legacy header for the protocol layer in transmitting and/or receiving a protocol data unit (PDU) of the protocol layer when it is not determined that the extended header is to be used,
wherein the extended header comprises a legacy indicator (L-I) field of a predetermined number of indicator bits for use in indicating a value of a characteristic of the PDU,
wherein there is a legacy indicator threshold value associated with the characteristic, the legacy indicator threshold value being a maximum value of the characteristic that can be indicated by the legacy indicator field L-I,
wherein the extended header comprises an extended indicator field (E-I) logically concatenated with the legacy indicator field L-I such that the E-I/L-I concatenation comprises sufficient number of bits to specify a value of the characteristic of the PDU beyond the legacy indicator threshold value,
wherein a size of the extended header for the protocol layer is no greater than a size of the legacy header for the same protocol layer, and
wherein the step of determining whether or not to use the extended header for the protocol layer comprises determining that the extended header for the protocol layer is to be used when a transport block (TB) size of the L1 layer is greater than a legacy TB threshold size.

15. The method of claim 11,
wherein the protocol layer is a medium access control (MAC) layer and the extended header is an extended MAC header,
wherein the legacy indicator field L-I is a legacy length field L of the extended MAC header for indicating a size of a corresponding MAC service data unit (SDU), the legacy TB threshold size being a maximum TB size that can be indicated by the legacy length field L, and
wherein the step of configuring PDU of the protocol layer comprises using an extended length field EL of the extended MAC header such that a logical concatenation EL/L of the extended length field EL and the legacy length field L comprises sufficient number of bits to specify a TB size greater than the legacy TB threshold size.

16. The method of claim 14,
  wherein the step of determining whether or not to use the extended header for the protocol layer comprises:
    receiving a configuration message from the network node; and
    determining that the received configuration message indicates that the extended header for the protocol layer will be used, and
  wherein the step of using the PDU of the protocol layer comprises, based on the received configuration message, any one or more of:
    using an extended sequence number field (PDCP ESN) to be logically concatenated with a legacy sequence number field (PDCP SN) in an extended PDCP header of a PDCP data unit;
    using an extended first missing PDCP SN field (EFMS) to be logically concatenated with a legacy first missing PDCP SN field (FMS) in the extended PDCP header of the PDCP data unit;
    using an extended segment offset field (RLC ESO) to be logically concatenated with a legacy segment offset field (RLC SO) in an extended RLC header of a RLC data unit:
    using an extended segment offset field (RLC ESO) to be logically concatenated with a legacy segment offset field (RLC SO) in the extended RLC header of the RLC data unit;
    using an extended segment offset start field (RLC ESOstart) to be logically concatenated with a legacy segment offset start field (RLC SOstart) in the extended RLC header of the RLC data unit;
    using an extended segment offset end field (RLC ESOend) to be logically concatenated with a legacy segment offset end field (RLC SOend) in the extended RLC header of the RLC data unit;
    using an extended length indicator field (RLC ELI) to be logically concatenated with a legacy length indicator field (RLC LI) in the extended RLC header of the RLC data unit;
    using an extended sequence number field (RLC ESN) to be logically concatenated with a legacy sequence number field (RLC SN) in the extended RLC header of the RLC data unit;
    using an extended length field (MAC EL) to be logically concatenated with a legacy length field (MAC L) in an extended MAC header of a MAC data unit; and
    using an extended format field (MAC EF) to be logically concatenated with a legacy format field (MAC F) in the extended MAC header of the MAC data unit.

17. The method of claim 16, wherein the configuration message received from the network node is a radio resource control (RRC) message.

18. The method of claim 16, wherein the configuration is based on a combination of any one or more of:
  per data radio bearers (DRBs),
  per specific RLC mode (Acknowledged/Unacknowledged), and
  per DL (downlink) or UL (uplink) direction.

19. The method of claim 16, wherein the configuration message received from the network node is separate from the extended header used in transmitting the PDU and separate from the extended header used in receiving the PDU.

20. The method of claim 19, wherein the configuration message specifies that the extended header is to be used on the uplink direction from the mobile terminal to the network node.

21. The method of claim 14,
  wherein the extended indicator field E-I of the extended header comprises one or more bits, and
  wherein bit position(s) of the extended indicator field E-I correspond to bit position(s) of reserved bit(s) of the legacy header for the protocol layer such that from a perspective of a legacy equipment, a structure of the extended header conforms to a structure of the legacy header.

22. The method of claim 14,
  wherein the extended indicator field E-I of the extended header comprises one or more bits, and
  wherein bit position(s) of the extended indicator field E-I are not contiguous with any of the bit position(s) of the legacy indicator field LI of the extended header.

23. A non-transitory computer readable medium storing therein programming instructions executable by a computing unit of a mobile terminal of a wireless network such that the computing unit performs the method of claim 14.

24. A network node of a wireless network structured to communicate with a mobile terminal, the network node comprising a plurality of protocol units including:
  a radio resource control (RRC) unit structured to perform functions associated with a RRC layer;
  a packet data convergence protocol (PDCP) unit structured to perform functions associated with a PDCP layer;
  a radio link control (RLC) unit structured to perform functions associated with a RLC layer; and
  a medium access control (MAC) unit structured to perform functions associated with a MAC layer,
  wherein at least one protocol layer unit is structured to:
    determine whether or not to use an extended header for a protocol layer in wirelessly communicating with a mobile terminal, the protocol layer being a layer above a physical (L1) layer,
    use an extended header for the protocol layer in transmitting and/or receiving a protocol data unit (PDU) of the protocol layer when it is determined that the extended header is to be used, and
    use a legacy header for the protocol layer in transmitting and/or receiving a protocol data unit (PDU) of the protocol layer when it is not determined that the extended header is to be used,
  wherein the extended header comprises a legacy indicator (L−1) field of a predetermined number of indicator bits for use in indicating a value of a characteristic of the PDU,
  wherein there is a legacy indicator threshold value associated with the characteristic, the legacy indicator threshold value being a maximum value of the characteristic that can be indicated by the legacy indicator field L-I,
  wherein the extended header comprises an extended indicator field (E-I) logically concatenated with the legacy indicator field L-I such that the E-I/L-I concatenation comprises sufficient number of bits to specify a value of the characteristic of the PDU beyond the legacy indicator threshold value,
  wherein a size of the extended header for the protocol layer is no greater than a size of the legacy header for the same protocol layer, and
  wherein the at least one protocol layer unit is structured to determine that the extended header for the protocol layer is to be used when a transport block (TB) size of the L1 layer is greater than a legacy TB threshold size.

25. The network node of claim 24,
wherein the protocol layer is a medium access control (MAC) layer and the extended header is an extended MAC header and the at least one protocol layer unit is the MAC unit;
wherein the legacy indicator field L-I is a legacy length field L of the extended MAC header for indicating a size of a corresponding MAC service data unit (SDU), the legacy TB threshold size being a maximum TB size that can be indicated by the legacy length field L, and
wherein the MAC unit is structured to use an extended length field EL of the extended MAC header such that a logical concatenation EL/L of the extended length field EL and the legacy length field L comprises sufficient number of bits to specify a TB size greater than the legacy TB threshold size.

26. The network node of claim 24, wherein the at least one protocol layer unit is structured to send a configuration message to the mobile terminal to use the extended header for the protocol layer.

27. The network node of claim 26,
wherein the at least one protocol layer unit is structured to determine any one or more of:
  a first condition of whether using the extended header will result in a greater throughput than a transmission without using the extended header,
  a second condition of whether sufficient transmission resources are available for the transmission using the extended header, and
  a third condition of whether the transmission using the extended header will meet a minimum quality of service (QoS) requirement associated with the transmission, and
wherein the at least one protocol layer unit is structured to send the configuration message to the mobile terminal to use the extended header for the protocol layer when it determines that any one or more of the first, second and third conditions are met.

28. The network node of claim 26, wherein the configuration is based on a combination of any one or more of:
  per data radio bearers (DRBs),
  per specific RLC mode (Acknowledged/Unacknowledged), and
  per DL (downlink) or UL (uplink) direction.

29. The network node of claim 26, wherein the configuration message is separate from the extended header used in transmitting the PDU and separate from the extended header used in receiving the PDU.

30. The network node of claim 29, wherein the configuration message specifies that the extended header is to be used on the uplink direction from the mobile terminal to the network node.

31. The network node of claim 24,
wherein the PDCP unit is structured to use any one or more of:
  an extended sequence number field (PDCP ESN) to be logically concatenated with a legacy sequence number field (PDCP SN) in an extended PDCP header of a PDCP data unit, and
  an extended first missing PDCP SN field (EFMS) to be logically concatenated with a legacy first missing PDCP SN field (FMS) in the extended PDCP header of the PDCP data unit,
wherein the RLC unit is structured to use any one or more of:
  an extended segment offset field (RLC ESO) to be logically concatenated with a legacy segment offset field (RLC SO) in an extended RLC header of a RLC data unit,
  an extended segment offset field (RLC ESO) to be logically concatenated with a legacy segment offset field (RLC SO) in the extended RLC header of the RLC data unit,
  an extended segment offset start field (RLC ESOstart) to be logically concatenated with a legacy segment offset start field (RLC SOstart) in the extended RLC header of the RLC data unit,
  an extended segment offset end field (RLC ESOend) to be logically concatenated with a legacy segment offset end field (RLC SOend) in the extended RLC header of the RLC data unit,
  an extended length indicator field (RLC ELI) to be logically concatenated with a legacy length indicator field (RLCLI) in the extended RLC header of the RLC data unit, and
  an extended sequence number field (RLC ESN) to be logically concatenated with a legacy sequence number field (RLC SN) in the extended RLC header of the RLC data unit, and
wherein the MAC unit is structured to use any one or more of:
  an extended length field (MAC EL) to be logically concatenated with a legacy length field (MAC L) in an extended MAC header of a MAC data unit, and
  an extended format field (MAC EF) to be logically concatenated with a legacy format field (MAC F) in the extended MAC header of the MAC data unit.

32. The network node of claim 24,
wherein the extended indicator field E-I of the extended header comprises one or more bits, and
wherein bit position(s) of the extended indicator field E-I correspond to bit position(s) of reserved bit(s) of the legacy header for the protocol layer such that from a perspective of a legacy equipment, a structure of the extended header conforms to a structure of the legacy header.

33. The network node of claim 24,
wherein the extended indicator field E-I of the extended header comprises one or more bits, and
wherein bit position(s) of the extended indicator field E-I are not contiguous with any of the bit position(s) of the legacy indicator field LI of the extended header.

34. The network node of claim 24,
wherein the network node is a network node of a source cell of a handover, and
wherein the network node is structured to alert a network node of a target cell of the handover of the extended header being used by the source cell to communicate with the mobile terminal.

35. The network node of claim 24,
wherein the network node is a network node of a target cell of a handover, and
wherein the network node is structured to:
  receive an indication from a network node of a source cell of the handover of the extended header being used by the source cell to communicate with the mobile terminal;
  determine whether the extended header will be used after the handover; and notify the mobile terminal of the decision on whether or not the extended header will be used after the handover.

36. A mobile terminal of a wireless network structured to communicate with a network node, the mobile terminal comprising a plurality of protocol units including:
a radio resource control (RRC) unit structured to perform functions associated with a RRC layer;
a packet data convergence protocol (PDCP) unit structured to perform functions associated with a PDCP layer;
a radio link control (RLC) unit structured to perform functions associated with a RLC layer; and
a medium access control (MAC) unit structured to perform functions associated with a MAC layer,
wherein at least one protocol layer unit is structured to:
determine whether or not to use an extended header for a protocol layer in wirelessly communicating with the network node, the protocol layer being a layer above a physical (L1) layer,
use an extended header for the protocol layer in transmitting and/or receiving a protocol data unit (PDU) of the protocol layer when it is determined that the extended header is to be used, and
use a legacy header for the protocol layer in transmitting and/or receiving a protocol data unit (PDU) of the protocol layer when it is not determined that the extended header is to be used,
wherein the extended header comprises a legacy indicator (L-I) field of a predetermined number of indicator bits for use in indicating a value of a characteristic of the PDU,
wherein there is a legacy indicator threshold value associated with the characteristic, the legacy indicator threshold value being a maximum value of the characteristic that can be indicated by the legacy indicator field L-I,
wherein the extended header comprises an extended indicator field (E-I) logically concatenated with the legacy indicator field L-I such that the E-I/L-I concatenation comprises sufficient number of bits to specify a value of the characteristic of the PDU beyond the legacy indicator threshold value,
wherein a size of the extended header for the protocol layer is no greater than a size of the legacy header for the same protocol layer, and
wherein the at least one protocol layer unit is structured to determine that the extended header for the protocol layer is to be used when a transport block (TB) size of the L1 layer is greater than a legacy TB threshold size.

37. The mobile terminal of claim 36,
wherein the protocol layer is a medium access control (MAC) layer and the extended header is an extended MAC header and the at least one protocol layer unit is the MAC unit;
wherein the legacy indicator field L-I is a legacy length field L of the extended MAC header for indicating a size of a corresponding MAC service data unit (SDU), the legacy TB threshold size being a maximum TB size that can be indicated by the legacy length field L, and
wherein the MAC unit is structured to use an extended length field EL of the extended MAC header such that a logical concatenation EL/L of the extended length field EL and the legacy length field L comprises sufficient number of bits to specify a TB size greater than the legacy TB threshold size.

38. The mobile terminal of claim 36,
wherein the mobile terminal is structured to receive a configuration message from the network node indicating that the extended header for the protocol layer will be used,
wherein the PDCP unit is structured to use, based on the received configuration message, any one or more of:
an extended sequence number field (PDCP ESN) to be logically concatenated with a legacy sequence number field (PDCP SN) in an extended PDCP header of a PDCP data unit, and
an extended first missing PDCP SN field (EFMS) to be logically concatenated with a legacy first missing PDCP SN field (FMS) in the extended PDCP header of the PDCP data unit,
wherein the RLC unit is structured to use, based on the received configuration message, any one or more of:
an extended segment offset field (RLC ESO) to be logically concatenated with a legacy segment offset field (RLC SO) in an extended RLC header of a RLC data unit,
an extended segment offset field (RLC ESO) to be logically concatenated with a legacy segment offset field (RLC SO) in the extended RLC header of the RLC data unit,
an extended segment offset start field (RLC ESOstart) to be logically concatenated with a legacy segment offset start field (RLC SOstart) in the extended RLC header of the RLC data unit,
an extended segment offset end field (RLC ESOend) to be logically concatenated with a legacy segment offset end field (RLC SOend) in the extended RLC header of the RLC data unit,
an extended length indicator field (RLC ELI) to be logically concatenated with a legacy length indicator field (RLCLI) in the extended RLC header of the RLC data unit, and
an extended sequence number field (RLC ESN) to be logically concatenated with a legacy sequence number field (RLC SN) in the extended RLC header of the RLC data unit, and
wherein the MAC unit is structured to use, based on the received configuration message, any one or more of:
an extended length field (MAC EL) to be logically concatenated with a legacy length field (MAC L) in an extended MAC header of a MAC data unit, and
an extended format field (MAC EF) to be logically concatenated with a legacy format field (MAC F) in the extended MAC header of the MAC data unit.

39. The mobile terminal of claim 38, wherein the configuration message received from the network node is a radio resource control (RRC) message.

40. The mobile terminal of claim 38, wherein the configuration is based on a combination of any one or more of:
per data radio bearers (DRBs),
per specific RLC mode (Acknowledged/Unacknowledged), and
per DL (downlink) or UL (uplink) direction.

41. The mobile terminal of claim 38, wherein the configuration message received from the network node is separate from the extended header used in transmitting the PDU and separate from the extended header used in receiving the PDU.

42. The mobile terminal of claim 41, wherein the configuration message specifies that the extended header is to be used on the uplink direction from the mobile terminal to the network node.

43. The mobile terminal of claim 36,
wherein the extended indicator field E-I of the extended header comprises one or more bits, and
wherein bit position(s) of the extended indicator field E-I correspond to bit position(s) of reserved bit(s) of the legacy header for the protocol layer such that from a perspective of a legacy equipment, a structure of the extended header conforms to a structure of the legacy header.

44. The mobile terminal of claim 36,
wherein the extended indicator field E-I of the extended header comprises one or more bits, and
wherein bit position(s) of the extended indicator field E-I are not contiguous with any of the bit position(s) of the legacy indicator field LI of the extended header.

\* \* \* \* \*

UNITED STATES PATENT AND TRADEMARK OFFICE
CERTIFICATE OF CORRECTION

PATENT NO. : 8,750,333 B2
APPLICATION NO. : 13/372893
DATED : June 10, 2014
INVENTOR(S) : Susitaival et al.

Page 1 of 1

It is certified that error appears in the above-identified patent and that said Letters Patent is hereby corrected as shown below:

In the Claims

In Column 18, Line 52, in Claim 15, delete "claim 11," and insert -- claim 14, --, therefor.

In Column 20, Line 47, in Claim 24, delete "(L-1)" and insert -- (L-I) --, therefor.

Signed and Sealed this
Twelfth Day of May, 2015

Michelle K. Lee
*Director of the United States Patent and Trademark Office*